US007028067B2

(12) United States Patent
Abraham et al.

(10) Patent No.: US 7,028,067 B2
(45) Date of Patent: Apr. 11, 2006

(54) GENERATION OF MASK-CONSTRAINED FLOATING-POINT ADDITION AND SUBTRACTION TEST CASES, AND METHOD AND SYSTEM THEREFOR

(75) Inventors: Ziv Abraham, Haifa (IL); Sigal Asaf, Beit Shearim (IL); Anatoly Koyfman, Kiryat Yam (IL); Shay Zadok, Bat Yam (IL)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 10/078,111

(22) Filed: Feb. 20, 2002

(65) Prior Publication Data
US 2003/0200244 A1    Oct. 23, 2003

(51) Int. Cl.
*G06F 11/263* (2006.01)
(52) U.S. Cl. ...................... 708/530; 714/738
(58) Field of Classification Search ................ 708/530; 714/738
See application file for complete search history.

(56) References Cited

U.S. PATENT DOCUMENTS

| | | | | |
|---|---|---|---|---|
| 3,921,142 | A * | 11/1975 | Bryant et al. | 708/530 |
| 5,488,573 | A * | 1/1996 | Brown et al. | 703/21 |
| 5,572,666 | A * | 11/1996 | Whitman | 714/32 |
| 5,600,658 | A * | 2/1997 | Qureshi | 708/530 |
| 5,841,960 | A * | 11/1998 | Ibusuki et al. | 714/32 |
| 6,438,722 | B1 * | 8/2002 | Bailey et al. | 714/736 |
| 6,601,204 | B1 * | 7/2003 | Tsuto | 714/739 |

OTHER PUBLICATIONS

Lewin et al., "Constraints Satisfaction for Test Programs Generation", *IBM Israel Science and Technology, Haifa Research Laboratory*, 4 pages, dlewin@haifasc.3vnet.ibm.com.

Aharon et al., "Test Program Generation for Functional Verification of PowerPC Processors in IBM", *IBM Israel-Haifa Research Lab*, 7 pages, yossi@haifasc3.vnet.ibm.com.

Grinwald et al., "User Defined Coverage—A Tool Supported Methodology for Design Verification", *IBM Research Lab in Haifa*, pp. 158-163, grinwald@vnet.ibm.com.

(Continued)

*Primary Examiner*—D. H. Malzahn
(74) *Attorney, Agent, or Firm*—Browdy and Neimark, PLLC

(57) ABSTRACT

A method and system for generating numerical test cases for testing binary floating-point arithmetic units for addition and subtraction operations, in order to verify the proper operation of the units according to a specified standard. The space for eligible test-cases is compatible with masks which stipulate the allowable forms of the operands and the result, including constant as well as variable digits in both the exponent and significand fields. The test-cases, which are generated randomly, cover the entire solution space without excluding any eligible solutions. All standard rounding modes are supported, and if a valid solution does not exist for a given set of masks, this fact is reported. The method is general and can be applied to any standard, such as the IEEE floating-point standard, in any precision. A system according to the present invention utilizes a set of sub-generators for biased exponents and significands, and also incorporates a fixed-point generator for performing calculations common to the other generators. The method relies on searching for solutions based on feasible carry sequences, and is also capable of generating test-cases for mask-constrained carry sequences.

21 Claims, 5 Drawing Sheets

OTHER PUBLICATIONS

Lichtenstein et al., "Model Based Test Generation for Processor Verification" 12 Pages, yossi@haifasc3.vnet.ibm.com.

Software Negligence and Testing Coverage, http://www.kaner.com, 16 pages.

* cited by examiner

US 7,028,067 B2

GENERATION OF MASK-CONSTRAINED FLOATING-POINT ADDITION AND SUBTRACTION TEST CASES, AND METHOD AND SYSTEM THEREFOR

FIELD OF THE INVENTION

The present invention relates to the testing of floating-point arithmetic units, and, more particularly, to the generation of numerical test cases for binary floating-point adders.

BACKGROUND OF THE INVENTION

When developing integrated circuits that perform floating-point arithmetic, designers typically base the representations of floating-point (FP) numbers and the constraints on the results of arithmetic operations on published standards, such as the well-known "IEEE standard for binary floating point arithmetics, An American National Standard, ANSI/IEEE Std 754-1995". Adherence to such standards guarantees that the circuitry will perform floating-point arithmetic with acceptable and predictable results. Although it is a relatively straightforward task to implement floating-point standards in a floating-point hardware unit, designers usually make modifications in the implementation to improve performance in special cases. Because of this, it is necessary to verify compliance of the finished design to the selected standard. In many instances, errors in floating-point implementation escape detection and find their way into production. Cases such as the well-known Pentium bug show that the verification process in this area is still far from being optimal. The ever-growing demand for increased performance, reduced time-to-market, and decreasing tolerance for errors all combine to make verification increasingly harder. The term "floating-point unit" herein denotes any device or system capable of performing binary floating-point computations by any means including, but not limited to, hardware, firmware, programmable logic arrays, and software.

There are many places problems can occur in the implementation of a floating-point unit, ranging from data problems on single instructions to the correct handling of sequences of instructions in which back-to-back events challenge superscalar implementations. This complexity stems both from the interpretation of the specification (architecture) as well as the peculiarities of the implementation (microarchitecture).

Although there is on-going work to develop formal proofs of adherence to a standard, formal methods are still far from providing a complete answer to the problem. The simulation of test cases (generating the test case data, running the test case on the target floating-point unit, and confirming the accuracy of the result), has traditionally been employed for verification, and therefore remains the foundation of the verification process.

It is the generating of floating-point test cases that is of interest regarding the present invention.

Test Case Generating Background

First, it is clear that there is an enormous, practically unlimited number of different calculation cases to test. In practice then, simulation can be done on only a very small portion of the existing space. Reducing the enormous number of potential test cases to a manageable number that can actually be tested is done through placing suitable constraints on the machine numbers so that the constrained set of machine numbers used in the test will be representative of a particular aspect of testing, but will still constitute a sufficient number of cases for thorough testing. (Constraints are discussed below.)

The rationale behind verification-by-simulation is that one acquires confidence in the correctness of a floating-point unit design by running a set of test cases that encompass a sufficiently large number of different cases, which in some sense is assumed to be a representative sample of the full space. The ability of the floating-point unit design to correctly handle all cases is inferred from the correct handling of the cases actually tested.

To confidently make the above inference requires the building of a set of test cases that covers all special implementations of the floating-point unit design. The problem then becomes one of how best to do this. Since both the architecture specification and the microarchitecture implementation tend to yield a myriad of special cases, generating the test cases using a uniform random distribution over the entire floating-point space would be highly inefficient. For example, it is common that executing an FADD instruction that results in a sum of zero exercises a specific part of the design logic, and therefore such a case should be verified. The probability of randomly generating two floating-point numbers that add to zero, however, is extremely low. Therefore, prior-art random test generators usually possess some internal Testing Knowledge (TK) to bias the test generation towards cases of interest. Such test generators are described in "Model-Based Test Generation For Processor Design Verification" by Y. Lichtenstein, Y. Malka and A. Aharon, *Innovative Applications of Artificial Intelligence* (IAAI), AAAI Press, 1994; "Constraint Satisfaction for Test Program Generation" by L. Fournier, D. Lewin, M. Levinger, E. Roytman and Gil Shurek, *Int. Phoenix Conference on Computers and Communications*, March 1995; and "Test Program Generation for Functional Verification of PowerPC Processors in IBM" by A. Aharon, D. Goodman, M. Levinger, Y. Lichtenstein, Y. Malka, C. Metzger, M. Molcho and G. Shurek, *32nd Design Automation Conference*, San Francisco, June 1995, pp. 279–285.

In effect, TK changes the probability distribution of a test space, better adapting that test space to existing knowledge. In a test-generator described in the foregoing references, the TK is in the form of C-language functions (called "generation functions") which can be added incrementally to the generator, such as by the users themselves. A serious limitation of this prior art approach, however, is that such generation functions are very complex and difficult to write, requiring a deep understanding of the Floating Point unit design. In practice, then, very few generating functions have been added.

Definitions

The following terms and abbreviations are used herein:

| | |
|---|---|
| Biased exponent | the sum of the exponent and a constant "bias" selected so that the biased exponent is always non-negative over the exponent's range. The use of a biased exponent allows representing both positive and negative exponents without requiring a sign. |
| Denormal | (a "denormalized number") a non-zero FP number whose exponent has a reserved value (usually the minimum permitted by the format), and whose explicit or implicit leading bit of the significand is zero. |

-continued

| | |
|---|---|
| Exponent | the component of a binary floating-point number that normally specifies the integer power of 2 which is multiplied by the significand to express the value of the represented number. In certain formats, reserved values of the exponent are used to indicate that the number is denormalized. |
| FP | Floating-Point. A binary loating-point number contains a sign, an exponent, and a significand. |
| FxP | Fixed-Point |
| Mask | a template for a binary number. A mask is a series of characters, each of which represents allowable values for the bit in the corresponding position of the binary number. There is exactly one character in a mask for each bit of the corresponding binary number, with characters in a one-to-one correspondence with the bits. Allowable mask characters include '0', '1', and 'x'. A '0' character indicates that the corresponding bit of the binary number must be a 0, whereas a '1' character indicates that the corresponding bit of the binary number must be a 1. An 'x' character is a "don't care", meaning that the corresponding bit of the binary number may be either 0 or 1. In a floating-point number, it is possible to specify separate masks for sign, exponent, and significand. |
| NaN | ("Not a Number") a symbolic entity encoded in FP format. |
| Normal | (a "normalized number") a non-zero FP number whose explicit or implicit leading bit of the significand is one. |
| Signficand | the component of a binary FP number that consists of a single explicit or implicit leading bit to the left of an implied binary point and a field of fraction bits to the right of the binary point. Even in implementations where the significand's leading bit (to the left of the binary point) is implied and is not explicitly present, the significand still includes that leading bit. Note that a significand differs from a "mantissa" in that a mantissa includes only the fraction field to the right of the binary point, whereas a significand also includes the bit to the left of the binary point. The concept of mantissa may be defined in such a way to include all of the bits of the significand, including the leftmost bit and not only the fraction bits. In this case and for a binary normalized significand, the mantissa would simply be the significand shifted one place to the right, or divided by a scaling factor of 2. |

The Set of Machine Numbers

For purposes of illustration, a non-limiting example of a binary floating-point number system is the IEEE standard 754 previously referenced. We assume that three integer constants are given, $E_{min}$, $E_{max}$, p. The machine numbers are those which can be represented in the form $v=(-1)^s \times 2^E \times b_0 b_1 b_2 \ldots b_{p-i}$, where $s \in \{0, 1\}$ represents the sign of v. E, representing the exponent of v, is an integer satisfying $E_{min} \leq E \leq E_{max}$. The bit values are denoted as $b_i \in \{0, 1\}$, and p is the "precision" of the system. The significand is $b_0 b_1 b_2 \ldots b_{p-1}$, whose binary point lies between $b_0$ and $b_1$. All machine numbers v that satisfy $|v| \geq 2^{E_{min}}$ are assumed to be normalized ($b_0=1$). Those machine numbers which are smaller in magnitude than $2^{E_{min}}$ (including zero) have $E=E_{min}$ and are denormalized ($b_0=0$). Thus, each machine number has a unique representation (note that the IEEE standard 754 requires the same uniqueness for single and double formats but not for extended formats).

Binary Representations of Machine Numbers and the Mask Constraint

Machine numbers are herein represented as strings of binary digits (bits). This is true for fixed point numbers as well as for floating point numbers. A mask related to a number is a string of characters of the same length (number of bits) as the number, all of whose characters are in the set $\{`0', `1', `x'\}$. A number and a mask are compatible if all the following conditions are met:

The number and the mask are of the same length (hence each bit of the number corresponds to a specific character of the mask);

For each '1' character of the mask, there is a 1 value in the corresponding bit of the number; and For each '0' character of the mask, there is a 0 value in the corresponding bit of the number.

If one or more of the above conditions are not met, the number and the mask are incompatible. Thus, a '1' or a '0' character of the mask determines uniquely the value of the corresponding bit of the number. An 'x' character in the mask leaves the corresponding bit value of the number undetermined.

A number is constrained by requiring it to be compatible with a given mask.

Where it is not convenient to represent a floating-point machine number by a single string of bits, it is possible (although not necessary) to split such a representation into a triplet of numbers:

| | |
|---|---|
| Sign: | A string of one bit, which is 0 for a '+' and 1 for a '−'. The numerical value is denoted by s (s = 0 or 1). |
| Biased exponent: | A string of w bits. This is interpreted to be a binary integer with the numerical value e, where $0 \leq e \leq 2^w - 1$. In a non-limiting generalization from the single and double formats of the IEEE standard 754, $E_{min} = 2 - 2^{w-1}$, $E_{max} = \text{bias} = 2^{w-1} - 1$. |
| Significand: | A string of p bits, $b_0 b_1 b_2 \ldots b_{p-1}$. Unlike the single and double formats of IEEE standard 754, note that $b_0$ is explicitly included in the string. Interpreting the string as a binary number with the binary point placed between $b_0$ and $b_1$, the numerical value of the significand is S, where $0 \leq S \leq 2 - 2^{1-p}$. |

Likewise, for convenience it is possible to speak of a triplet of masks corresponding to the above triplet of numbers. For example, it is possible to prepare and manipulate a particular mask as a significand mask.

Note that the above splitting of a floating-point number (or a mask) is for convenience and is non-limiting. In particular, it is still possible to represent a complete floating-point machine number as a single sequence of bits, and it is still possible to speak of a single mask corresponding to such a complete floating-point machine number.

The value v, which corresponds to such a triplet of bit strings is given by:
1. If $e=2^w-1$ and $S \neq 1$, then v is NaN regardless of s.
2. If $e=2^w-1$ and $S=1$, then $v=(-1)^s \times \infty$ (Infinity).
3. If $0<e<2^w-1$ and $S \geq 1$, then $v=(-1)^s \times 2^{e-bias} \times s$ (Normalized numbers).
4. If $e=0$ and $S<1$ then $v=(-1)^s \times 2^{Emin} \times S$ (Denormalized numbers and zeroes).

Machine numbers are herein denoted in underlined italics (such as a machine number a).

Rounding

Mathematically, most numbers in the set of real numbers cannot be represented by a finite number of digits (not even the entire subset of rational numbers), and most of those rational numbers which can be represented by a finite number of digits cannot be represented by the small fixed number of digits in the various floating-point formats. It is common, therefore, that the results of a floating-point operation be adjusted, or "rounded" to fit within the confines of the floating-point representation. The result of a rounding operation is a floating-point number that approximates the precise value that should result from the computation. Rounding, when applied, always introduces an error into the computation, but this error is small enough to be ignored in the vast majority of practical applications.

In practice, the precise value is not necessarily computed, but rather an intermediate result that represents floating-point numbers using a larger number of significand bits than the permitted format of the output (also ref erred to herein as the "output result"). The rounding thus consists of a truncation of the excess digits of the intermediate result, and a possible incrementing of the least significant bit of the significand, with a possible carry of this incrementing to more significant bits of the significand.

There are several different rounding modes, all of which must be taken into account when generating test cases:

round up—round toward the closest floating-point number to the intermediate result that lies between the intermediate result and $+\infty$.

round down—round toward the closest floating-point number to the intermediate result that lies between the intermediate result and $-\infty$.

round to zero—round toward the closest floating-point number to the intermediate result that lies between the intermediate result and zero.

round to nearest/even—round toward the floating point number closest to the intermediate result regardless of the direction. If the intermediate result lies exactly halfway between the nearest larger floating-point number and the nearest smaller floating-point number, choose the nearest floating-point number whose least significant significand bit is zero ("even").

Coverage

How does one know that a certain set of tests is sufficient? This question is related to the notion of coverage, that is, to the comprehensiveness of the set related to the target floating-point unit. Coverage models are usually defined, and the set of teats should fulfill all the existing requirements. A coverage model constitutes a set of related cases. Coverage modeling is discussed in "Software negligence and testing coverage" by C. Kaner, *Proceedings of STAR 96: the Fifth International Conference, Software Testing, Analysis and Review*, pages 299–327, June 1996; and "User defined coverage—a tool supported methodology for design verification" by R. Grinwald, E. Harel, M. Orgad, S. Ur, and A. Ziv, *Proceedings of the 35th Design Automation Conference (DAC)*, pages 158–163, June 1998.

As an example, a common coverage model—albeit one that is far from trivial to fulfill—requires enumerating all major IEEE Floating Point types simultaneously for all operands of all FP instructions. For a given instruction with three operands, say ADD, this potentially yields in the order of a thousand ($10^3$) cases to cover, assuming 10 major FP types (±NaN's, ±Infinity, ±Zero, ±Denormal, ±Normal). This model can be further refined by adding more FP types, such as Minimum and Maximum Denormals, and so forth. Obviously, not all cases are possible (for example, the addition of two positive denormal numbers cannot reach infinity), so that the actual number of cases is in fact lower than the size of the Cartesian product. A coverage model, or the set of all coverage models, is really an attempt to partition the set of all calculation cases in such away that the probability distribution should be similar for all subsets.

A Generalized Test-Case Generator

Consider an automatic test generator whose input is the description of a coverage model, and whose output is a set of tests covering that model. A coverage model is defined by specifying a set of different constraints to be fulfilled, where each constraint corresponds to a particular task targeted by the coverage model. More precisely, a coverage model will have the form of a sequence of FP instructions, with sets of constraints on the input operand(s), the intermediate result(s), and the results of the participating instructions. Covering the model then requires providing a set of tests which display the instruction sequence, and which possesses the property that each constraint is satisfied by at least one test of the set. The general appearance of a single instruction constraint is of the following form:

$$\text{FPinst (Op1 in Pattern1) (Op2 in Pattern2) (IntRes in Pattern3) (Res in Pattern4)} \qquad (1)$$

where FPinst is a generic floating point instruction with two input operands (Op1 and Op2), one intermediate result (IntRes), and one output result (Res). The case of two input operands and a single intermediate result is used here for simplicity, but of course generalization to any number of such parameters is possible.

A Pattern is a construct representing the logical union ($\cup$) among sets of FP numbers. The sets serve as constraints defining (in fact limiting) the allowable FP numbers for each term of expression (1). Patterns have the general following form:

$$\text{Pattern} = \text{Set}_1 \cup \text{Set}_2 \cup \ldots \cup \text{Set}_N \qquad (2)$$

where each $\text{Set}_1$ is a set of FP numbers. Each task of the coverage model corresponds to a specific selection of $\text{Set}_i$ for each Pattern. Covering the task reduces then to select a data—tuple where each individual datum belongs to the corresponding selected $\text{Set}_i$. Thus, the number of different tasks originated from a single such instruction is the product of the number of Sets for each participating Pattern. The number of tasks for a sequence is the product of the number of tasks for each individual Instruction.

There are different kinds of constraints on FP numbers:

Ranges—constraints on the upper and lower limits of a machine number or element of number triplet (for example, an exponent between 0 and 2);

Weights—constraints on the limits of the number of bits of value 1 within a machine number or element of a number triplet (for example: at least 1 bit set in the significand);

Run-length—constraints on the lengths of continuous streams of 1's and/or 0's (for example: a stream of at least 45 consecutive 1's in the significand); and Masks—constraints on individual bits of a machine number (described herein in detail).

It is also possible to specify a set for which the selected value should be a function of the value previously selected for another input operand. For example, a selected exponent can be at a distance of at most 2 from the exponent selected for the previous input operand. Set operations (intersection, union, complement, of same and different set types) are also possible.

For a generalized test-case generator, any architecture resource which might influence FP instruction's results is settable as an input. For example, in the non-limiting case of IEEE standard architecture, this applies to Rounding Modes and Enabled Flags.

A generalized test-case generator solves constraints that are derived from set restrictions on instruction operands. Given a restriction, the generator ideally seeks a random instance that solves the restriction, where the solutions are uniformly distributed among the set of all solutions. In practice, the complexity involved is sometimes overwhelming, especially for complex or multiple restrictions. In such cases, the generator at least ensures that each solution has a reasonable probability of being selected. As described above, constraints can be given on the input operands, the output or even on both simultaneously. It should be clear that there is a significant leap in complexity involved in solving constraints on outputs. Indeed, in contrast to the case of the input operands, the constraint on outputs includes the instruction semantics. However, even output constraints are usually solvable analytically In reasonable time complexity. Constraint restrictions start to become largely intractable when simultaneous constraints are requested on both input operands and outputs. For example, it is largely unclear how to find an instance in which the result of a MUL instruction has at least 45 bits set in its significand and the inputs are restricted by specific ranges or masks. Such a case might seem artificial, but it is often the case that cases such as this one are important to check due to specific implementation methods. Moreover, during the implementation itself, it is sometimes important to explore whether some cases are possible at all—it is desirable to know if a solution does not exist. Knowing that some cases can be neglected can be critical in optimizing the microarchitecture. In fact, in many cases, it can be shown that the constraint problem is NP-Hard. Thus, the generalized test case generator's approach for these problems should be heuristic, mixing probabilistic, search spaces and semi-analytic algorithms. Some important cases of simultaneous constraints, however, are solvable analytically, including, for example, Range constraints or Mask constraints on all operands for the FP ADD instruction.

Test Generation Via Masks

The present inventors have realized that it is possible to advantageously specify the generation of test cases using masks to constrain the floating-point numbers of the test cases, as described previously. Masks are an important way of defining sets of floating-point machine numbers by providing constraints on the bits of those numbers.

There are a number of important advantages in utilizing masks for specifying constraints in the generating of test cases:

Masks are easy to visualize, understand, and manipulate.

Using masks does not require the user to develop any complicated algorithms or to write any software code, as is required for prior-art generation functions.

Masks can be easily created to describe a wide range of machine numbers having specific properties of interest to floating-point unit designers. It is common for an implementation to treat a specific bit, or set of specific bits, in a particular manner, and masks are a natural means to introduce a bias towards numbers having specific bits set to prescribed values, while the values of other bits are assigned randomly.

At the architectural level, masks allow defining all the IEEE generic types of FP numbers and symbolic objects: Normals, Denormals, infinities, zeroes, NaN's, and so forth. Thus, a coverage model handling all types of numbers and symbols is expressible through masks.

Although masks are not as general as the range, weight, or run-length constraints previously described, it is relatively straightforward to produce a finite (though possibly large) mask set which incorporates and expressed all the properties of a given range, weight, or run-length constraint.

FIG. 1 illustrates the development of mask-constrained test cases. (Note that in this particular illustration, a floating-point number is taken as being associated with a single mask, as opposed to a triplet of masks as previously discussed.) Starting with a test concept 101, a specified floating-point operation along with some Testing Knowledge 102 is compiled into an operation, mask, and rounding specification 103, which selects a rounding mode for the given floating-point operation and a set of suitable masks 104, which includes:

Mask(s) for input operand(s); and

Mask for the output result.

Floating-point operation, rounding mode, and mask set 104 are input to a floating-point test case generator 105. Floating-point test case generator 105 in turn outputs the floating-point operation, rounding mode, and a set of machine numbers 106, which includes:

Machine number(s) for the input operand(s); and

Machine number for the output result.

Floating-point operation, rounding mode, and machine number set 106 constitute a solution 107. If, however, there exists no set of machine numbers 106 compatible with mask set 104 (which is possible, such as when the specified result mask is incompatible with the input operand masks given the specified floating-point operation), then there is no solution. In this case, solution 107 is a determination that no solution actually exists.

If there exists a set 106, the machine numbers thereof, along with the floating-point operation and rounding mode, would then be input to the target floating-point unit (not shown) to see if how the unit performs for the given floating-point operation on the given inputs, and if the unit produces the given output result. If the target floating-point unit properly duplicates the machine number for the output result as given in set 106, then the unit has passed this particular test. Otherwise, if the target unit does not properly duplicate the machine number for the output result as given in set 106, there is a design error in the unit which must be corrected. Likewise, if solution 107 determines that there is in fact no solution, it may be possible to test the target unit to verify that the unit in fact does not perform any computation that results in a set of machine numbers corresponding to the masks given in set 106, because doing so also indicates a design error in the unit. Thorough testing requires exercising the target floating-point unit with a large number of such test cases for a variety of conditions.

As an example (based on the concepts in IEEE standard 754), consider a hypothetical binary floating point format of eight bits, whose structure is seeefff. Namely, there is one bit for a sign, three bits for a biased exponent and four bits for a fraction. In analogy with the IEEE formats single and double, the significand has five bits, $E_{min}=-2$, $E_{max}=\text{bias}-3$. Given three masks $M_a=0100\text{x}101$, $M_b=001\text{x}1011$, and $M_c=010\text{xx}10\text{x}$, the solution requires three floating point numbers $\underline{a}$, $\underline{b}$, and $\underline{c}$, which are compatible with the respective masks, such that $\underline{c}=\text{round}(\underline{a}+\underline{b})$. Assuming that round stands for round to nearest/even, one solution is $\underline{a}=01000101$, $\underline{b}=00101011$, and $\underline{c}=01001100$.

In the scheme illustrated in FIG. 1, it is necessary to construct floating-point test-case generator 105 with the following properties in mind:

All valid solutions must have roughly the same probability of being produced by the test-case generator; and in particular, The solution set must not arbitrarily exclude any valid solution. In other words, every valid solution must have a non-zero probability of being selected.

Currently, however, there are no such mask-constrained floating-point test-case generators available, even for a restricted set of floating-point operations such as addition and subtraction. In order to create a floating-point test-case generator, it is necessary to have as a minimum, a floating-point test-case generator for addition and subtraction, which can solve the hollowing problem: Given masks for three machine numbers and a rounding mode, generate machine numbers $\underline{a}$, $\underline{b}$, and $\underline{c}$, which are compatible with the given masks and satisfy $\underline{c}=\text{round}(\underline{a}\pm\underline{b})$, where round corresponds to the given rounding mode.

There is thus a need for, and it would be highly advantageous to have, a mask-constrained floating-point test case generator for floating-point addition and floating-point subtraction which has the desired properties listed above. This goal is met by the present invention.

SUMMARY OF THE INVENTION

The present inventors have recognized that the lack of a practical framework for generating constrained, meaningful test cases is a major deficiency in the prior art, and represents the principal obstacle to efficient verification. The present invention, therefore, approaches this problem from the overview presented in the following sections.

It is an object of the present invention to solve the following problem: Given masks for three machine numbers and a rounding mode round, generate machine numbers, $\underline{a}$, $\underline{b}$, $\underline{c}$, which are compatible with the masks and satisfy $\underline{c}=\text{round}(\underline{a}\pm\underline{b})$.

It is an object of the present invention to develop a method for generating three floating-point machine numbers $\underline{a}$, $\underline{b}$, and $\underline{c}$ corresponding to three given masks $M_a$, $M_b$, and $M_c$, and a rounding mode round, such that $\underline{c}=\text{round}(\underline{a}+\underline{b})$, where either or both $\underline{a}$ and $\underline{b}$ may be positive or non-positive.

It is also an object of the present invention that all valid solutions have roughly the same probability of being produced by the method, and that no valid solutions be excluded.

It is moreover an object of the present invention that the method support general binary floating-point standards, including but not limited to IEEE standard floating-point arithmetic when generalized to include all allowed FP format sizes (such as 32 bits, 64 bits, 80 bits, 128 bits). With respect to this particular goal, it is noted that the innovations of the present invention are not necessarily limited to binary implementations, but can be applied in other number systems as well. Although binary systems are of primary importance, because current floating-point standards are expressed explicitly in terms of binary numbers, it is understood that the present invention is not limited to binary arithmetic, and the details of the embodiments herein presented are to be taken as non-limiting examples.

It is further an object of the present invention to develop a system for implementing the method.

The basic problem may be split into two sub-problems, which may be solved by two generators of machine numbers, respectively:

Floating-point generator for addition: Given six masks, for biased exponents and for significands, $M_{ea}$, $M_{Sa}$, $M_{eb}$, $M_{Sb}$, $M_{ec}$, $M_{Sc}$, the generator either generates three non-negative machine numbers, $\underline{a}$, $\underline{b}$, $\underline{c}$, whose biased exponents and whose significands are compatible with the corresponding masks and satisfy, $\underline{c}=\text{round}(\underline{a}+\underline{b})$, or states that there is no solution.

Floating-point generator for subtraction: Given six masks, for biased exponents and for significands, $M_{ea}$, $M_{Sa}$, $M_{eb}$, $M_{Sb}$, $M_{ec}$, $M_{Sc}$, the generator either generates three non-negative machine numbers, $\underline{a}$, $\underline{b}$, $\underline{c}$, whose biased exponents and whose significands are compatible with the corresponding masks and satisfy, $\underline{c}=\text{round}(\underline{a}-\underline{b})$, or states that there is no solution.

Note that when the problem is reduced to the two cases above, the three machine numbers, $\underline{a}$, $\underline{b}$, and $\underline{c}$, are all non-negative. In the case of the floating-point generator for subtraction, the values assigned to $\underline{a}$ and $\underline{b}$ are interchanged if necessary so that $\underline{a} \geq \underline{b}$. Note also that in the case of the floating-point generator for subtraction, where $\underline{a} \neq \underline{b}$ it is possible to exercise the target floating-point unit with two test cases resulting from a single solution found by the generator: one test case is simply $\underline{c}=\text{round}(\underline{a}-\underline{b})$, where $\underline{c}$ is positive; and the other test case is $\underline{c}=\text{round}(\underline{b}-\underline{a})$, where $\underline{c}$ is negative. As far as the floating-point test-case generator is concerned, these are mathematically identical and do not require a separate method of solution. From the standpoint of verification testing of the target floating-point unit, however, they are distinct problems, and the successful passing of one test by the target floating-point unit does not necessarily imply the successful passing of the other test.

The method of the present invention solves the above problem for simultaneous mask constraints. That is, there is a mask constraint on both input operands $\underline{a}$ and $\underline{b}$, and on the output result $\underline{c}$ for any specified rounding mode and for the floating-point operations FADD and FSUB. It is noted that the distinction between addition and subtraction can be implied in the sign of the operand $\underline{b}$: If $\underline{b}<0$, a subtraction operation is implied; otherwise, an addition operation is implied. It is further noted that a single solution found by the binary floating-point test-case generator of the present invention can be verified on the target floating-point unit for both FADD and FSUB by adjusting the sign of one of the input operands. That is, given the solution $\underline{a}$, $\underline{b}$, and $\underline{c}$ where $\underline{c}=\text{round}(\underline{a}+\underline{b})$, it is possible to verify FADD on the floating-point unit for $\underline{a}$, $\underline{b}$, and $\underline{c}$, and it is also possible to verify FSUB on the floating-point unit for $\underline{a}$, $-\underline{b}$, and $\underline{c}$. The internal implementation of FADD in the target floating-point unit can be structurally different from that of FSUB, justifying a separate verification pass, but the identical result $\underline{c}$ should be output in both cases.

Rounding Modes Needed

In the general case, there are the following rounding modes:

$$\text{round} \in \{\text{round down, round up, round toward zero, round to nearest/even}\} \quad (3)$$

However, since the problem has been reduced to cases where the three machine numbers are all non-negative, it is possible to omit, without loss of generality, the round toward zero mode. Since all non-zero machine numbers will be positive, this mode is equivalent to round down.

Novelty

There are several novel aspects of the present invention:

The present invention goes beyond the employment of masks for expressing floating-point machine number constraints to include a novel use of masks for controlling the stream of carry bits created during the floating-point addition operation. In addition to providing a key portion of the method, this also enriches the verification process by allowing a floating-point unit to be exercised through different carry configurations.

The present invention discloses a fixed-point generator which has a number of unexpected uses in various places throughout the floating-point test-case generation.

Notational Conventions

The following notation is employed herein in the context $\underline{c} = \text{round}(\underline{a} \pm \underline{b})$:

- $\underline{a}$, $\underline{b}$, $\underline{c}$ floating-point machine numbers
- $e_i$ biased exponent
- $E_i$ unbiased exponent
- $M_i$ mask
- n boundary index, the position of the leftmost 2 in a carry sequence
- N number of bits in a fixed-point machine number
- p number of bits in a significand (including the most significant bit)
- q maximum definite binary point shift, usually comparable in magnitude to p (shifts greater than q are considered indefinite)
- $q_i$ biased exponent shift $$q_a = e_c - e_a, \quad q_b = e_c - e_b \quad (1)$$

- $Q_i$ unbiased exponent shift $$Q_a = E_c - E_a, \quad Q_b = E_c - E_b \quad (2)$$

- $S_i$ significand
- w number of bits in a biased exponent
- x, y, z fixed-point machine numbers FIG. 2 is a block diagram of a floating-point addition/subtraction test-case generator according to the present invention. A mask set 201 is input into a processing unit 202, which generates test-cases in an output 250, which, as previously noted, may be either floating-point machine numbers compatible with mask set 201 and a specified rounding mode (not shown) or the case of "no solution". In the non-limiting example presented herein, processing unit 202 includes a $q_a$, $q_b/q_b$, $q_c$ selector 205 whose output goes to a biased exponent generator 210, which includes a definite biased exponent generator 215 and an indefinite biased exponent generator 220. For addition, $q_a$, $q_b/q_b$, $q_c$ selector 205 selector selects $q_a$ and $q_b$, whereas for subtraction $q_a$, $q_b/q_b$, $q_c$ selector 205 selector selects $q_b$ and $q_c$. Then, a $Q_a$, $Q_b/Q_b$, $Q_c$ calculator 225 computes $Q_a$ and $Q_b$ for addition or $Q_b$ and $Q_c$ for subtraction, and sends them to a significand generator 230, which includes an addition significand generator 235 and a subtraction significand generator 240. Both biased exponent generator 210 and significand generator 230 rely on a fixed-point generator 245 in making their respective computations. Finally, the output of biased exponent generator 210 and significand generator 230 are combined to output solution set 250.

Note that, in FIG. 2, biased exponent generator 210 is a non-limiting example of a more general exponent generator that need not be restricted to biased exponents only. Because an unbiased exponent shift is calculated, it is also possible to conceptualize the system of FIG. 2 in terms of such general exponent generator.

Given the selected and calculated values for $q_a$, $q_b$, $Q_a$, $Q_b$ for addition (or $q_b$, $q_c$, $Q_b$, $Q_c$, in the case of subtraction), it is possible to produce the biased exponents and the significands independently, by invoking number generators such as those shown in FIG. 2, and defined as follows:

Definite biased exponent generator 215 performs the following: Given the two non-negative integers $q_1$, $q_2$, with $q_1 \in \{0, 1\}$, and three masks of length w, $M_1$, $M_2$, $M_3$, for the biased exponents, definite biased exponent generator 215 either generates and outputs three biased exponents $e_1$, $e_2$, $e_3$, which are compatible with the respective masks and satisfy $e_3 = e_1 + q_1 = e_2 + q_2$, or outputs that no solution exists.

Indefinite biased exponent generator 220 performs the following: Given the two non-negative integers $q_1$, $q_2$, with $q_1 \in \{0, 1\}$, and three masks of length w, $M_1$, $M_2$, $M_3$, for the biased exponents, indefinite biased exponent generator 220 either generates an integer $q_2$ and three biased exponents $e_1$, $e_2$, $e_3$, which are compatible with the respective masks and satisfy $e_3 = e_1 + q_1 = e_2 + q_2$, such that $q_2 > q$, or outputs that no solution exists.

Addition significand generator 235 performs the following: Given two non-negative integers $Q_a$, $Q_b$, one of which is 0 or 1, three masks of length p for the significands, $M_{Sa}$, $M_{Sb}$, $M_{Sc}$, and a rounding mode, round$\in$\{round down, round up, round to nearest/even\}, addition significand generator 235 either generates three significands $S_a$, $S_b$, $S_c$ which are compatible with the respective masks and satisfy $S_c = \text{round}(2^{-Q_a} S_a + 2^{-Q_b} S_b)$, or outputs that no solution exists.

Subtraction significand generator 240 performs the following: Given two non-negative integers $Q_b$, $Q_c$, one of which is 0 or 1, and three masks of length p for the significands, $M_{Sa}$, $M_{Sb}$, $M_{Sc}$, and a rounding mode, round$\in$\{round down, round up, round to nearest/even\}, subtraction significand generator 240 either generates three significands $S_a$, $S_b$, $S_c$, which are compatible with the respective masks and satisfy $2^{-Q_c} S_c = \text{round}(S_a - 2^{-Q_b} S_b)$, or outputs that no solution exists.

FIG. 3 is a simplified block diagram of fixed-point generator 245 (as also appears in FIG. 2) according to the present invention. A mask set 303 containing masks $M_x$, $M_y$, and $M_z$ for three fixed-point machine numbers x, y, and z is input into fixed-point generator 245. In additions a mask $M_c$ 305 for the carry stream is also input. Note that $M_x$, $M_y$, and $M_z$ each have N characters corresponding to the N bits of x, y, and z, whereas $M_c$ has N+1 characters. Based on the inputs, fixed-point generator 245 outputs a solution 307, which either contains a set of three fixed-point machine numbers x, y, and z which are compatible with mask set 303 ($M_x$, $M_y$, and $M_z$) and mask 305 ($M_c$); or which is the case of "no solution".

It is to be noted that all of the generators of the present invention generate a solution that is in effect randomly selected from the complete set of valid solutions, and if the set of valid solutions is empty, the case of "no solution" is output instead. It is not required that a generator output all of the valid solutions, but only a single solution, provided that at least one valid solution exists. It is also not required that a generator be able to determine how many valid solutions there are. The generators, however, do not arbitrarily exclude any valid solution. That is, there is a non-zero probability that any specific valid solution will be generated. Subsequent operation of a generator will usually generate a different, randomly-generated solution. If the complete set of valid solutions is of high order, then it will be overwhelmingly probable that repeated operations of a generator will result in the output of distinct solutions, so repetitions of identical solutions are normally rare.

Solution-Seeking Method

As will be discussed in detail below, the generators make extensive use of a solution-seeking method illustrated in FIG. 4. In the present invention, the solution-seeking method is used in a number of places to seek a solution that may satisfy any of a variety of specified mathematical conditions. The solution that is sought may represent intermediate results within processing unit 202 (FIG. 2) which are used in constructing floating-point test-case solution 250, as well as floating-point test-case solution 250 itself.

As illustrated in FIG. 4, associated with the method is a finite list of input choices 401 which contains a set of parameters for the solution being sought. Other parameters may be applied, as discussed below. The method begins at a start block 403, immediately after which a decision point 405 checks to see if list 401 is empty. If so, then there are no available parameters for the solution, indicating that there is no solution, in which case at an output block 407 the method terminates with the output of the "no solution" case. Otherwise, in a selection block 409 one of the elements of list 401 is selected at random. Then, in a solution-searching block 411 a solution is sought utilizing the selection from the list. A decision point 413 checks to see if a valid solution has been found. If so, the solution is output in a block 415, and the method terminates. Otherwise, in a block 417 the selection made in block 409 is erased from list 401, and the method resumes once again at decision point 405. Ultimately, because list 401 is finite, either a valid solution will be returned in block 415, or the "no solution" case will be returned in block 407.

The following points are noted regarding solution-seeking block 411:

The inner details of block 411 depend on the specific details of the problem for which a solution is sought;

A valid solution may depend on additional parameters within block 411 besides the selection made from list 401; and Block 411 may encapsulate one or more instances of this same solution-seeking method—that is, the entire solution-seeking method may be used recursively within block 411, such that another set of all the elements shown in FIG. 4 appear within block 411. For example, the floating-point addition test-case generator as shown in FIG. 2 utilizes a solution-seeker as shown in FIG. 4, whose list 401 contains a finite number of $q_a$, $q_b$ pairs. But within the floating-point addition test-case generator there is addition significand generator 235 which itself utilizes a solution-seeker as shown in FIG. 4, whose list 401 contains a finite number of elements ("tails triplets") which are based on a $Q_a$, $Q_b$ pair calculated from the $q_a$, $q_b$ pair selected from the floating-point addition test-case generator's list 401. This is explained in detail below, but is mentioned here to show how the solution-seeker of FIG. 4 may be used recursively.

Block 411 and decision-point 413 may be repeated sequentially within the loop shown in FIG. 4, with found solutions from one block sent to the next such block as an intermediate or partial solution.

Example of a Solution

Here is an example of a triplet of masks which may be used as input to a binary floating-point addition test-case generator according to the present invention, illustrated in the non-limiting case of IEEE standard 754 double precision (1 sign bit, 11 biased exponent bits, 52 fraction bits, for a total of 64 bits):

The furnished masks specify two denormal floating point numbers as input operands for addition, and the mask for the sum specifies a normalized floating-point number.

|  | s | e | S |
|---|---|---|---|
| $M_a$ | 0 | 00000000000 | xxxxxxxxxxxxxxxxxxxxxxxxxxxxxxxxxxxxxxxxxxxxxxxxxxxx |
| $M_b$ | 0 | 00000000000 | xxxxxxxxxxxxxxxxxxxxxxxxxxxxxxxxxxxxxxxxxxxxxxxxxxxx |
| $M_c$ | 0 | 00000000001 | xxxxxxxxxxxxxxxxxxxxxxxxxxxxxxxxxxxxxxxxxxxxxxxxxxxx |

One possible solution is:

|  | s | e | S |
|---|---|---|---|
| a | 0 | 00000000000 | 1111111111111111111111111111111111111111111111111111 |
| b | 0 | 00000000000 | 0000000000000000000000000000000000000000000000000001 |
| c | 0 | 00000000001 | 0000000000000000000000000000000000000000000000000000 |

Another solution is:

|  | s | e | S |
|---|---|---|---|
| a | 0 | 00000000000 | 1111100000000000000000000000000000000000000000000000 |
| b | 0 | 00000000000 | 0001010101010101010101010101010101010101010101010101 |
| c | 0 | 00000000001 | 0000110101010101010101010101010101010101010101010101 |

The complexity of the method according to the present invention is polynomial, and tests confirm that it operates efficiently and quickly: in practice, solutions are found almost immediately for a large variety of instances.

It will also be understood that the system according to the invention may be a suitably programmed computer. Thus, the invention contemplates a computer program being readable by a computer for executing the method of the invention. The invention further contemplates a machine-readable memory tangibly embodying a program of instructions in data storage executable by a machine for performing the method of the invention. The invention moreover contemplates a machine-readable memory tangibly embodying a program of instructions in data storage executable by a machine for emulating the system of the invention.

According to the present invention there is provided a system for generating floating-point test-cases for verifying the operation of a floating-point arithmetic unit, the system including a processing unit which includes: (a) an exponent generator, for generating floating-point exponents; (b) a significand generator, for generating floating-point significands; and (c) a fixed-point generator coupled to the exponent generator and to the significand generator; wherein the processing unit is configured to receive a specified arithmetic operation selected from a group that includes addition and subtraction, a specified rounding mode, a first input operand mask, a second input operand mask, and an output result mask; and wherein the processing unit is configured to output a set of floating-point numbers which includes a first input operand compatible with the first input operand mask, a second input operand compatible with the second input operand mask, and an output result compatible with the output result mask; and wherein the output result corresponds to the specified arithmetic operation on the first input operand and the second input operand for the specified rounding mode.

In addition, according to the present invention there is provided a method of seeking a solution, if a solution exists, to a specified mathematical condition, wherein the solution is used in constructing a floating-point test-case for verifying the operation of a floating-point arithmetic unit, wherein a complete generated test case is a set of floating-point numbers for a specified arithmetic operation selected from a group including addition and subtraction, and for a specified rounding mode, and wherein a generated test case includes a first input operand, a second input operand, and an output result; and wherein the first input operand is compatible with a first input operand mask, the second input operand is compatible with a second input operand mask, and the output result is compatible with an output result mask; the method including the steps of: (a) preparing a list of choices upon which the solution is based; (b) testing whether the list of choices is empty; (c) outputting, if the list of choices is empty, that no solution exists; (d) randomly choosing, if the list of choices is not empty, a choice of the list as a selection; (e) searching for a solution to the specified mathematical condition, based on the selection; (f) outputting, if the searching was successful, the solution; (g) erasing, if the searching was not successful, the selection from the list; and (h) repeating step (a) through step (g) until outputting occurs.

Furthermore, according to the present invention there is provided a method of generating a set of fixed-point numbers containing a first addend, a second addend, and a sum, wherein the first addend is compatible with a first addend mask, the second addend is compatible with a second addend mask, the sum is compatible with a sum mask, and wherein the addition of the first addend and the second addend results in a carry sequence of carry bits, wherein each carry bit has a unique index in the carry sequence, wherein the carry sequence is compatible with a carry sequence mask and wherein each carry bit has a value in the group consisting of 0, 1, and 2, and wherein there exists a boundary index in the carry sequence corresponding to the lowest index of a carry bit having the value 2; the method including the steps of: (a) constructing a list of possible boundary indices; (b) testing whether the list is empty; (c) outputting, if the list is empty, that no solution exists; (d) randomly choosing, if the list is not empty, a boundary index from the list as a selection; (e) searching for a carry sequence based on the selection, which is compatible with the carry sequence mask; (f) erasing, if the searching was not successful, the selection from the list; (g) constructing, if the searching was successful, a first addend compatible with the first addend mask, a second addend compatible with the second addend mask, and a sum compatible with the sum mask; (h) outputting the first addend, the second addend, the sum, and the carry sequence; and (i) repeating step (a) through step (h) until outputting occurs.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
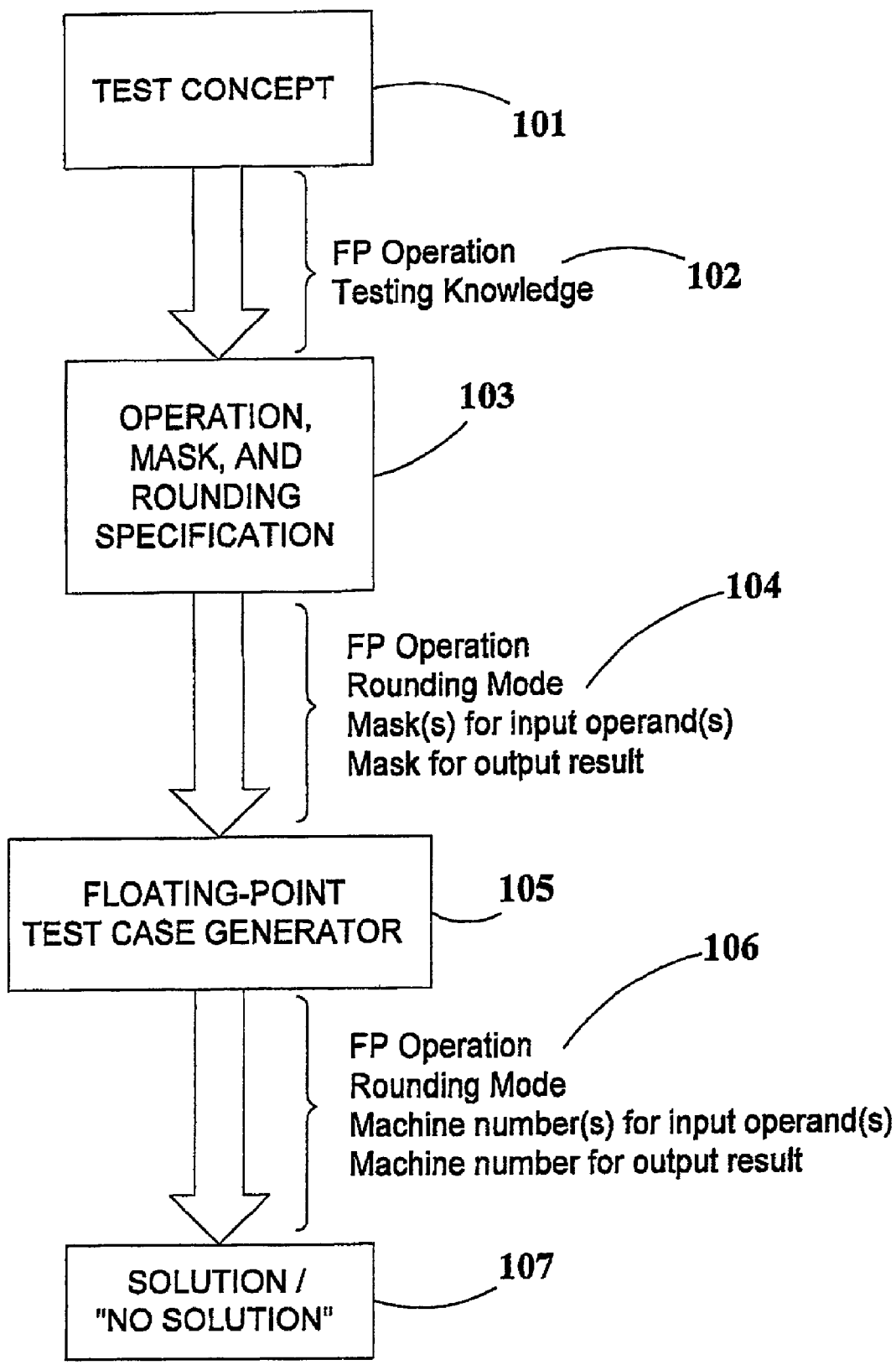
FIG. 1 illustrates the progression from test concept to mask specification to the finding of a solution, or the determination that there is no solution.

The principles and operation of a floating-point addition/subtraction test-case generating method and generator according to the present invention may be understood with reference to the drawings and the accompanying description.

Outline of the Method

As was stated earlier, the problem of generating floating point numbers, satisfying $c$=round($a \pm b$), may be divided into two cases: addition of non-negative machine numbers and subtraction of non-negative machine numbers.

Consider first the addition case. Namely, let $c$=round($a+b$), where $a$, $b$, $c$ are non-negative machine numbers. The biased exponent shifts are denoted $q_a = e_c - e_a$ and $q_b = e_c - e_b$, where $e_a$, $e_b$, $e_c$ are the biased exponents. It is not difficult to see that $q_a$, $q_b$ are non-negative integers, one of which must be either 0 or 1. Likewise, the unbiased exponent shifts are denoted $Q_a = E_c - E_a$ and $Q_b = E_c - E_b$, where $E_a$, $E_b$, and $E_c$ are the unbiased exponents. It is easy to see that $Q_a$, $Q_b$ are also non-negative integers, one of which must be either 0 or 1. Usually $Q_a = q_a$, $Q_b = q_b$ but this is not always so. For addition there are the following five cases:

$$e_a > 0,\ e_b > 0,\ e_c > 0: Q_a = q_a,\ Q_b = q_b \qquad (6)$$

$$e_a = 0,\ e_b > 0,\ e_c > 0: Q_a = q_a - 1,\ Q_b = q_b \qquad (7)$$

$$e_a > 0,\ e_b = 0,\ e_c > 0: Q_a = q_a,\ Q_b = q_b - 1 \qquad (8)$$

$$e_a = 0,\ e_b = 0,\ e_c > 0: Q_a = q_a - 1,\ Q_b = q_b - 1 \qquad (9)$$

$$e_a = 0,\ e_b = 0,\ e_c = 0: Q_a = q_a,\ Q_b = q_b \qquad (10)$$

For subtraction the outcome is similar: With $c$=round($a-b$) there are $q_b = e_a - e_b$, $q_c = e_a - e_c$, $Q_b = E_a - E_b$, and $Q_c = E_a - E_c$, where one of $q_b$, $q_c$ is either 0 or 1, and one of $Q_b$, $Q_c$ is either 0 or 1. Thus, there are an additional five cases:

$$e_c > 0,\ e_b > 0,\ e_a > 0: Q_c = q_c,\ Q_b = q_b \qquad (11)$$

$$e_c = 0,\ e_b > 0,\ e_a > 0: Q_c = q_c - 1,\ Q_b = q_b \qquad (12)$$

$e_c>0, e_b=0, e_a>0: Q_c=q_c, Q_b=q_b-1$ (13)

$e_c=0, e_b=0, e_a>0: Q_c=q_c-1, Q_b=q_b-1$ (14)

$e_c=0, e_b=0, e_a=0: Q_c=q_c, Q_b=q_b$ (15)

Figure 2:
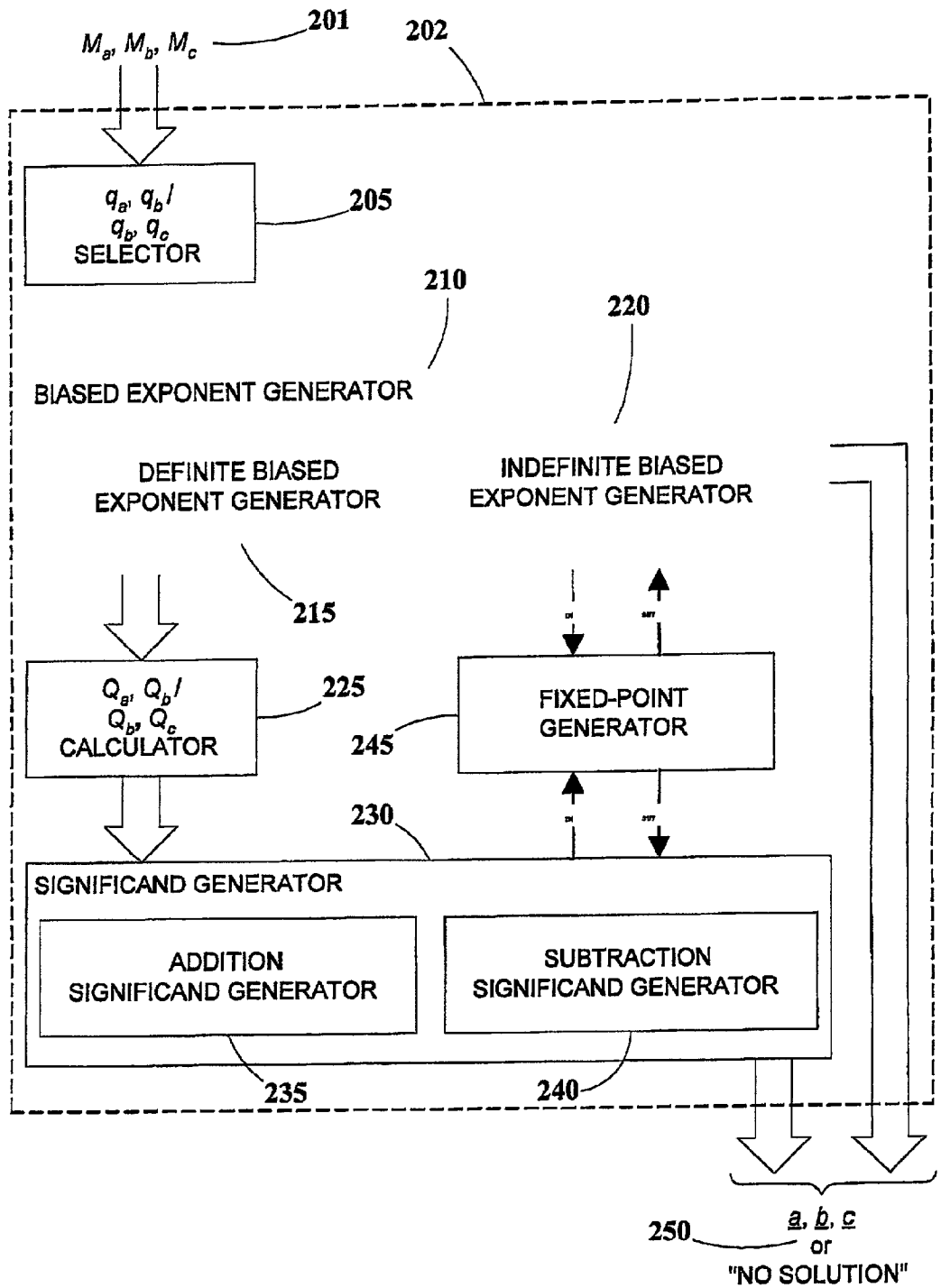
FIG. 2 is a block diagram of a floating-point addition/subtraction test-case generator according to the present invention.

As illustrated in FIG. 2 for the non-limiting example of processing unit 202, after mask set 201 has been given, the generation of machine numbers is started by selector 205, which selects values for $q_a$, $q_b$ for addition, or $q_b$, $q_c$ for subtraction. With known values for these numbers, it may be possible for biased exponent generator 210 to find valid solutions for the biased exponents, after which calculator 225 can calculate $Q_a$, $Q_b$ for addition or $Q_b$, $Q_c$ for subtraction. For addition, calculator 225 relies on Case (6), Case (7), Case (8), Case (9), or Case (10), above, as appropriate. Likewise, for subtraction, calculator 225 relies on Case (11), Case (12), Case (13), Case (1), or Case (15), above, as appropriate. Based on this, significand generator 230 is able to complete the process for output 250.

Figure 4:
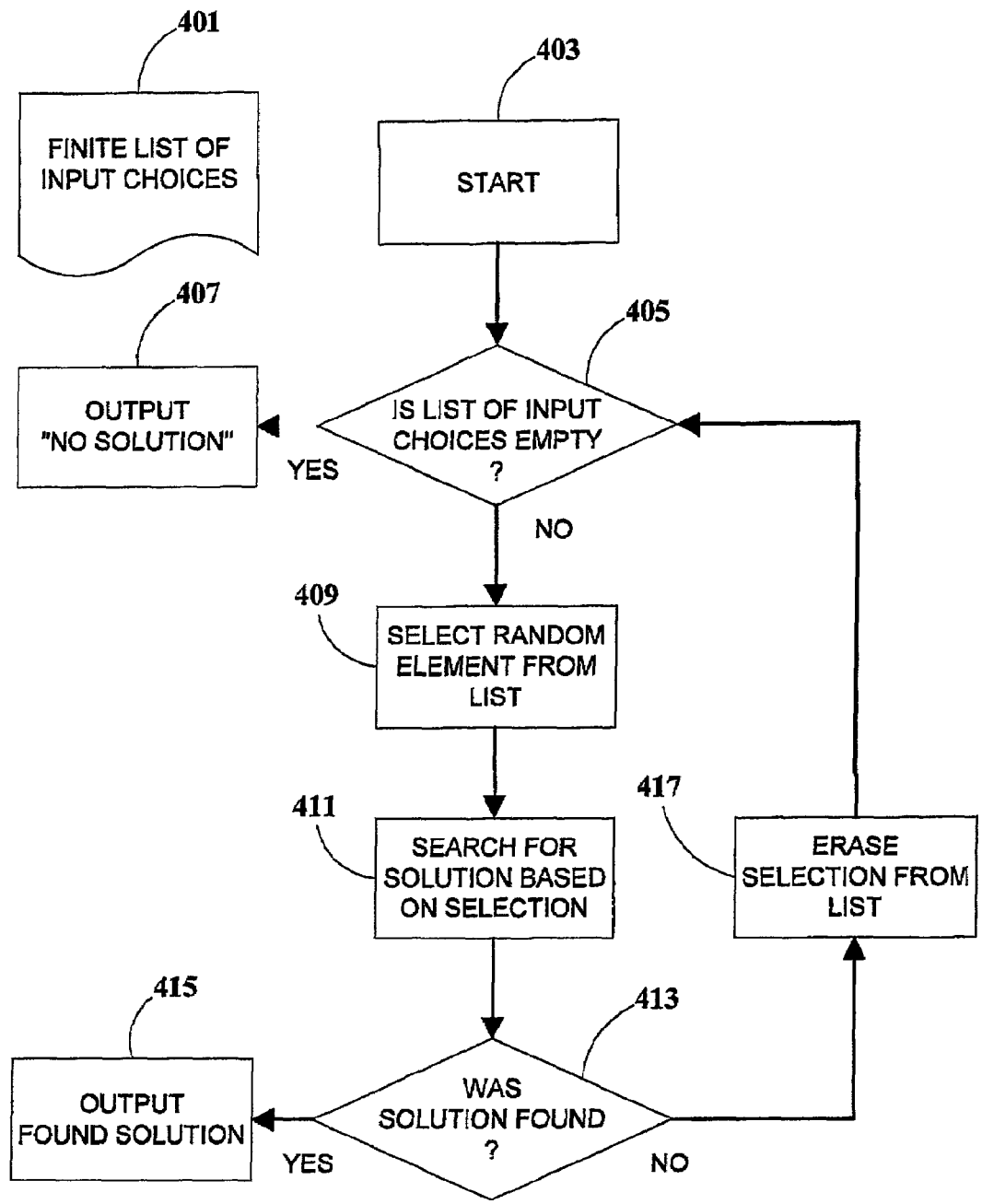
FIG. 4 is a flow-chart showing the steps of a generalized solution-seeking method according to the present invention.

The addition/subtraction test-case generator illustrated in FIG. 2 makes use of the solution-seeking method illustrated in FIG. 4. In order to do this, it is first necessary to produce list 401 for $q_a$, $q_b$ in the case of addition, or $q_b$, $q_c$ in the case of subtraction. Table 1 shows a list of such pairs:

TABLE 1

| $q_a$, $q_b$ Pairs | | | | | | | | | | | | | | | | | | | | | | | | |
|---|---|---|---|---|---|---|---|---|---|---|---|---|---|---|---|---|---|---|---|---|---|---|---|---|
| $q_a$ | 0 | 0 | 1 | 1 | 0 | 0 | ... | 0 | 0 | 1 | 1 | ... | 1 | 1 | 2 | 3 | ... | q | >q | 2 | 3 | ... | q | >q |
| $q_b$ | 0 | 1 | 0 | 1 | 2 | 3 | ... | q | >q | 2 | 3 | ... | q | >q | 0 | 0 | ... | 0 | 0 | 1 | 1 | ... | 1 | 1 |

Note that, while Table 1 is expressed as $q_a$, $q_b$ pairs (for addition), the pairs are equally valid as $q_b$, $q_c$ pairs (for subtraction). Solutions for pairs 0, >q; 1, >q; >q, 0; and >q, 1 are handled by indefinite biased exponent generator 220 (FIG. 2). Solution for all other pairs are handled by definite biased exponent generator 215. The exact value of q in the table is not specified, but if a convenient value close to p is selected, there will be approximately 4p pairs in Table 1. Within the floating-point test-case generator, as shown in FIG. 2, calculator 225 calculates $Q_a$, $Q_b$ for addition or $Q_b$, $Q_c$ for subtraction, as may be necessary for internal finding of significand solutions, as discussed below.

The solution-seeker of FIG. 4 is then invoked, with solution-searching block 411 set up to seek solutions according to the following (making reference to FIG. 2):

1. use either definite biased exponent generator 215 or indefinite biased exponent generator 220 as appropriate (according to the above criteria for the input pair) to seek a solution triplet for $e_a$, $e_b$, and $e_c$ that is compatible with the exponent masks of mask set 201; and 2. compute $Q_a$, $Q_b/Q_b$, $Q_c$ via calculator 225 and use either addition significand generator 235 or subtraction significand generator 240 as appropriate to seek a solution triplet for $S_a$, $S_b$, and $S_c$ that is compatible with the significand masks of mask set 201.

If either one or both of the above solutions do not exist, decision-point 413 (FIG. 4) branches to erase block 417. Otherwise, if both of the above solutions exist, the method has found a valid solution triplet $e_a$, $S_a$; $e_b$, $S_b$; and $e_c$, $S_c$, having both exponents and significands, and therefore decision-point 413 branches to output block 415.

The Fixed-Point Generator

As noted previously, several of the computations required for a floating-point generator according to the present invention require a fixed-point generator.

In implementing significand generator 230 (FIG. 2), for example, note that, since $Q_a$, $Q_b$ (or $Q_b$, $Q_c$) are known (as output from calculator 225), it is possible to shift the significands until they are properly aligned so that they have identical exponents, and then add (or subtract) them precisely the way fixed-point numbers are added (or subtracted). To do this, it is necessary to have a fined-point generator.

Before specifying the exact function of the fixed-point generator, first consider the process of adding two positive binary integers, x+y=z: The addends in this process are x and y, and the sum is z. The process starts by adding the rightmost (least significant) bits of x and y. If the sum is less than 2 then it is equal to the rightmost bit of z and there is no carry. If the sum is not less than 2, there is a carry of 1. Next, the carry is added along with the following bits of x and y. Once again, if the sum is less than 2, there is no carry. If the sum is not less than 2, there is a carry of 1. This is repeated through the final (most significant) bits of x and y.

Thus, during the addition process, a sequence of carries, each of which is either 0 or 1, is generated. The carry sequence represents the carries from the successive digits of the addends. Note that the fixed-point generator considers only the addition of two numbers.

In the following discussion, the bit-numbering convention for a binary fixed-point number containing N bits is as follows: the leftmost (most significant) bit is assigned an index value of m=0, and the rightmost (least significant) bit is assigned an index value of m=N−1.

If the values of the bite of the addends are $x_m=i$, $y_m=j$ and those of the sum are $z_m=k$, then there is the equation:

$$i+j+C_{m+1}=k+2C_m \quad (m=0, 1, \ldots, N-1) \quad (16)$$

where $C_m$ is the carry sequence, representing the carries resulting from the addition of successive digits of the addends. The bits themselves always are such that i, j, k∈{0, 1}. For the carry, it is also normally the case that $C_m$∈{0, 1}. However, a round up process may add an additional 1 to the carry and produce an effective carry of 2, so for this reason it is convenient to allow $C_m$, $C_{m+1}$∈{0, 1, 2}. Note that whereas (m=0, 1, . . . , N−1) for the bits of the fixed-point numbers, (m=0, 1, . . . , N) for the carry sequence. $C_m$ is the carry out of bit m and into bit m−1, where bit m and bit m−1 actually exist. For example, $C_N$ is the carry into bit N−1 only, because there is no bit N. Likewise, $C_0$ is the carry out of bit 0 only, because there is no bit −1. $C_0$ and $C_N$ are boundary values, and usually both have a value of zero. For generality, however, it is possible that $C_0 \neq 0$ and $C_N \neq 0$.

It is important to note that, while $C_m$, $C_{m+1}$∈{0, 1, 2}, there are restrictions on the appearance of a value of 2 in a carry position;

$$C_m=2 \Rightarrow C_{m+1}=2 \quad (17)$$

because the only way a carry position (in m) value can be 2 is if the previous carry position (in m+1) is 2. Restriction (2) can be rewritten as $$C_{m+1} < 2 \Rightarrow C_m < 2 \quad (18)$$

And $$C_{m+1} = 2 \Rightarrow C_m \geq 1 \quad (19)$$

because even if i+j=0 in position m, a carry of 2 in position m+1 will propagate at least to a value of 1 in position m.

Because of Restrictions (17), (18), and (19), it is easy to see that if there are any 2's in the carry sequence, they are all grouped together to the right, and that there is a 1 to the immediate left of the leftmost 2. For example, the following is a possible carry sequence into a 16-bit sum:

0 1 1 0 1 0 1 2 2 2 2 2 2 2 2 2

The following, however, are not possible carry sequences:

0 1 1 0 1 0 1 2 2 2 2 2 2 2 2 1—violates Restrictions (17)/(18)

0 1 1 0 1 0 0 2 2 2 2 2 2 2 2 2—violates Restriction (19).

Thus although $C_m, C_{m+1} \in \{0, 1, 2\}$ implies that there are 9 ($=3^2$) different combinations for the pair $(C_m, C_{m+1})$, there are in actuality only 6 different allowable combinations, because the pairs (0,2), (2,0), and (2,1) are ruled out by Restrictions (17), (18), and (19), leaving only the following set of possible pairs for $(C_m, C_{m+1})$:

$$(C_m, C_{m+1}) \in \{(0,0), (0,1), (1,0), (1,1), (1,2), (2,2)\} \quad (20)$$

Set (20) is important in the construction of carry sequences. An innovation of the present invention for solving the fixed point generator problem is to first construct the sequence $C_m$, and only later construct the bits of x, y, and z. This is discussed in detail below.

The input to the fixed point generator includes masks of length N: $M_x$, $M_y$, $M_z$, of the form described earlier, for the numbers x, y, z. The input also includes a mask, $M_C$, of length N+1, which corresponds to the sequence of carries. This carry sequence mask can include the characters '0', '1', '2', and 'x', where in analogous fashion to the previously-defined mask characters, '0', '1', and '2' completely specify the value of the corresponding carry, whereas an 'x' leaves the corresponding carry undetermined.

The fixed point generator is then defined as follows:

Fixed-point generator: Given three masks, $M_x$, $M_y$, $M_z$, of length N for three fixed-point binary numbers of N bits each, and given one mask, $M_C$, of length N+1 for a corresponding carry sequence, the fixed point generator either generates three fixed-point binary numbers x, y, z, which satisfy z=x+y in conjunction with a carry sequence, all of which are compatible with their respective masks, or states that there is no solution.

The operation of the fixed-point generator is discussed in the following sections.

Mask Combination Numbers and Case Numbers

The basic relations which control the construction of the sequences $x_m = i$, $y_m = j$, $z_m = k$, (m=0, 1, ..., N-1) and $C_m$, (m=0, 1, ..., N) are the condition of compatibility with the masks and Equation (16), previously discussed. Clearly these conditions might be self-contradictory. Where such contradictions exist, the fixed-point generator states that there is no solution.

Given an index m, each value of the bits i, j, k corresponds to a character in the appropriate mask. This character may be either an 'x' or a number ('0' or '1'). With such a classification of the characters of the mask, each triplet of masks elements is one of eight possible types of triplets (for example, all three of the characters may be 'x'; i corresponds to a number and j and k both correspond to an 'x'; and so forth). Each of the eight types of triplets may be assigned a number, which is denoted as MCN (Mask Combination Number). Table 2 below lists the values. In this table n means a number character in the mask ('0' or '1') and x means an 'x' character in the mask.

TABLE 2

| | Mask Combination Numbers | | | | | | | |
|---|---|---|---|---|---|---|---|---|
| MCN | 0 | 1 | 2 | 3 | 4 | 5 | 6 | 7 |
| i | n | n | n | n | x | x | x | x |
| j | n | n | x | x | n | n | x | x |
| k | n | x | n | x | n | x | n | x |

Note that Equation (16) can be alternately expressed in the form:

$$i+j-k = 2C_m - C_{m+1} \quad (21)$$

Given the masks $M_x$, $M_y$, $M_z$ and a numerical value for the index m, it is possible to assign an MCN value and the numerical values of some of the variables i, j, k. For MCN=0, 1, 2, 3, 4, 5, and 6, there is sufficient information to compute a Case Number CN, where CN=i+j-k, when all three i, j, and k are known (n)—MCN 0 (22)

CN=i+j, when only i and j are known (n) and k is unknown (x)—MCN 1 (23)

CN=i-k, when only i and k are known (n) and j is unknown (x)—MCN 2 (24)

CN=i, when only i is known (n) and k and j are unknown (x)—MCN 3 (25)

CN=j-k, when only j and k are known (n) and i is unknown (x)—MCN 4 (26)

CN=j, when only j is known (n) and k and i are unknown (x)—MCN 5 (27)

CN=-k, when only k is known (n) and i and j are unknown (x)—MCN 6 (28)

Then the pairs $(C_m, C_{m+1})$ which are possible for each MCN, CN combination are as follows:

TABLE 3

$(C_m, C_{m+1})$ Pairs for MCN and CN values

MCN = 0, CN = i + j − k
CN = −1: (0, 1)
CN = 0: (0, 0), (1, 2)
CN = 1: (1, 1)
CN = 2: (1, 0), (2, 2)
MCN = 1, CN = i + j
CN = 0: (0, 0), (0, 1), (1, 2)
CN = 1: (0, 0), (1, 1), (1, 2)
CN = 2: (1, 0), (1, 1), (2, 2)
MCN = 2, CN = i − k or MCN = 4, CN = j − k
CN = −1: (0, 0), (0, 1), (1, 2)
CN = 0: (0, 0), (1, 1), (1, 2)
CN = 1: (1, 0), (1, 1), (2, 2)
MCN = 3, CN = i or MCN = 5, CN = j
CN = 0: (0, 0), (0, 1), (1, 1), (1, 2)
CN = 1: (0, 0), (1, 0), (1, 1), (1, 2), (2, 2)
MCN = 6, CN = −k
CN = −1: (0, 0), (0, 1), (1, 1), (1, 2)

TABLE 3-continued ($C_m$, $C_{m+1}$) Pairs for MCN and CN values

CN = 0: (0, 0), (1, 0), (1, 1), (1, 2), (2, 2)
MCN = 7, CN=0
CN = 0: (0, 0), (1, 0), (0, 1), (1, 1), (1, 2), (2, 2)

The determination of the ($C_m$,$C_{m+1}$) pairs in Table 3 is by straightforward application of Equation (21), given what is known about i, j, and k. For example, for MCN 0, all three are known, so the various combinations can be computed precisely. In the case i=j=0, k=1, CN=−1. According to Equation (21), the only values of $C_m$,$C_{m+1}$ which can satisfy −1=2$C_m$−$C_{m+1}$ are $C_m$=0 and $C_{m+1}$=1, so the only possible ($C_m$,$C_{m+1}$) pair is (0,1), as shown in Table 3 for CN=−1 under MCN 0. As another example, for MCN 1 only i and j are known, and k is indeterminate and thus CN is simply given by i+j, as shown in Equation (23). For i=j=0, CN=0, and there are three ($C_m$,$C_{m+1}$) pairs that give this result in Equation (21): (0,0) with k=0; (0,1) with k=1; and (1,2) with k=0. These are the values shown in Table 3 for CN=0 under MCN 1. The rest of Table 3 is compiled in the same manner. For MCN 7, a value of CN=0 is assigned, because all three of i, j, and k are indeterminate. For this value, the complete Set (20) is present.

This list of 15 CN values in Table 3 is exhaustive, because for each pair of MCN, CN all possible pairs ($C_m$, $C_{m+1}$) are included for all possible values. This list is a basis for the construction of feasible sequences $C_m$, (m=0, 1, . . . , N). A feasible sequence $C_m$ is compatible with $M_C$, where there exists at least one triplet of corresponding numbers x, y, z, compatible with $M_x$, $M_y$, $M_z$, respectively. Since the list in Table 3 is exhaustive, it is possible to construct every feasible sequence $C_m$, and these sequences are used to search for solving triplets x, y, z, such that no valid solution is excluded from being found.

List of n-Values

Recalling Restrictions (17), (18), and (19), it is seen that if, for some index m∈{0, . . . , N−1}, $C_m$=2 then it is necessary that $C_{m+1}$=2 also. And if $C_{m+1}$=2, then it is necessary that $C_m$≠0 (that is, $C_m$∈{1, 2}). This implies that one of the following is true:

1. There exists a boundary index n∈{1, . . . , N} such that $C_m$=2 for all m≧n, $C_m$=1 for m=n−1 and $C_m$∈{0, 1} for all m<n.
2. All of the carries are 2 (n=0 in this case).
3. All of the carries are in {0, 1} (n=N+1 in this case).

A feasible boundary index n∈{0, 1, . . . , N+1} is generally not unique, and there might exist several possible values for n. Therefore, construct a list of boundary index n-values which includes all of the values of n that correspond to solutions, and no other values of n. Clearly, for all n≦m<N, $C_m$=$C_{m+1}$=2. So, looking in Table 3 it is seen that for all such m the pair (MCN,CN) must be one of: (0,2), (1,2), (2,1), (3,1), (4,1), (5,1), (6,0), (7,0). Since $C_{n-1}$=1, $C_n$=2 for n∈{1, . . . , N} it is inferred for such n that it is necessary for m=n−1 that the pair (MCN,CN) is one of: (0,0), (1,≠2), (2,≠1), (3,x), (4,≠1), (5,x), (6,x), (7,x), where ≠1 means CN≠1, ≠2 means CN≠2 and x means that CN may have any value. Additional restrictions on n are imposed by the mask $M_C$. It is necessary that $C_{n-1}$, $C_n$, . . . , $C_N$ are all compatible with this mask.

Given the masks, this permits the construction of a preliminary list of possible values of n. As seen below, this list is often too large, and some terms must be erased.

Feasible Carry Sequence

The sequence $C_m$ is completed, given a value for n, by setting values to $C_0$, $C_1$, . . . , $C_{n-2}$. These missing values of carries must all be in {0,1}. Hence, starting from Table 3 the list of pairs ($C_m$,$C_{m+1}$) is modified by erasing from it all of the pairs which include 2. The remaining list, which is relevant to the construction of the missing carries, may be replaced by the following equivalent list of inference rules:

TABLE 4

Carry Sequence Inference Rules

MCN = 0, CN = i + j − k
CN = −1: $C_m$ = 0,$C_{m+1}$ = 1
CN = 0: $C_m$ = $C_{m+1}$ = 0
CN = 1: $C_m$ = $C_{m+1}$ = 1
CN = 2: $C_m$ = 1, $C_{m+1}$ = 0
MCN = 1, CN = i + j
CN = 0: $C_m$ = 0
CN = 1: $C_m$ = $C_{m+1}$
CN = 2: $C_m$ = 1
MCN = 2, CN = i − k or MCN = 4, CN = j − k
CN = −1: $C_m$ = 0
CN = 0: $C_m$ = $C_{m+1}$
CN = 1: $C_m$ = 1
MCN = 3, CN = i or MCN = 5, CN = j
CN = 0: $C_m$ = 1 ⇒$C_{m+1}$ = 1
$C_{m+1}$ = 0 ⇒$C_m$ = 0
CN = 1: $C_m$ = 0 ⇒$C_{m+1}$ = 0
$C_{m+1}$ = 1 ⇒$C_m$ = 1
MCN = 6, CN = −k
CN=−1: $C_m$ = 1 ⇒$C_{m+1}$ = 1
$C_{m+1}$ = 0 ⇒$C_m$ = 0
CN= 0: $C_m$ = 0 ⇒$C_{m+1}$ = 0
$C_{m+1}$ = 1 ⇒$C_m$ = 1
MCN = 7, CN = 0
CN = 0: No restrictions Like the list of pairs in Table 3 from which Table 4 is derived, this set of inference rules is exhaustive in the sense that each feasible sequence $C_0$, . . . , $C_{n-1}$, of {0,1} terms, must be compatible with these rules, and each such sequence, which is compatible with these rules and with $M_C$, is feasible.

In setting values to the carries $C_0$, . . . , $C_{n-1}$, these values are constrained by the mask $M_C$ and by the inference rules of Table 4. In addition, $C_{n-1}$=1 if n∈{1, 2, . . . , N}. The mask $M_C$ uniquely defines those terms of $C_m$ which correspond to non 'x'-characters (note, however, that a '2' character in $M_C$ is permitted only for m≧n. Otherwise n should be erased from the list of n-values). The set of inference rules of Table 4 may be divided into three (not disjoint) groups:

1. Assignment rules: for example, $C_m$=$C_{m+1}$=0; $C_m$=1; etc.
2. Right continuation rules: for example, $C_m$=1⇒$C_{m+1}$=1; $C_m$=$C_{m+1}$; etc.
3. Left continuation rules: for example, $C_{m+1}$=0⇒ $C_m$=0; $C_m$=$C_{m+1}$; etc.

In principle, the solution-seeking method illustrated in FIG. 4 is used here also, where input list 401 contains a list of prospective n-values and block 411 operates as described below to search for a suitable carry sequence or output that there is no solution.

First applying only the assignment rules, it is possible to assign values to some of the carry terms. Note that there are several ways to deduce a definite value for a $C_m$ (mask, assignment rules, $C_{n-1}$=1). It may happen that there may be contradictions. Therefore, each time a definite value is deduced for a given $C_m$, it is necessary to check to see if the particular carry bit was assigned a different value earlier. A contradiction means that this particular n should be erased from the list of n-values.

Suppose all of the methods, described above for deducing a definite value for a $C_m$, were used and no contradiction was found. Some of the defined carries may be neighbors ($C_m$, $C_{m+1}$). For each such pair of neighbors it is necessary to find the MCN and CN corresponding to the index m, and test for a contradiction by the corresponding inference rule from Table 4. If there is a contradiction, that n must be erased from the list of n-values. If all of the pairs of neighbors were tested and no contradiction was found, the continuation rules are applied, one at a time. This process will create chains of consecutive defined carries, separated by chains of consecutive (yet) undefined carries. As the process continues the chains of undefined carries shrink and it may happen that one of them disappears completely. That is, the right end of one chain of defined carries becomes a neighbor of the left end of the following chain of defined carries. Such neighbors must be tested for contradiction by the inference rules of Table 4. If any contradiction is found then that n should be erased from the list of n-values. If the process ends and cannot be continued any further and no contradiction was found, then either all of the carries are defined and there is a complete, feasible, sequence of carries, or some chains of undefined carries were left over. In this case, a point was reached where no more contradictions are expected. It is then possible to choose one end of an undefined carries chain and choose for a value for that end of either 0 or 1, at random. No contradiction can arise from this operations because, as was mentioned above, the set of inference rules of Table 4 is exhaustive. The new carry becomes a left or a right end of a chain of defined carries. The continuation rules are applied to this new end, again and again, until the end of the chain meets an end of another chain or until no further continuation rule can be applied, and then an undefined carry is assigned at random. This process is repeated until all of the carries are assigned definite values. Note that if the new end meets another chain of defined carries, namely if the new end becomes a neighbor of another end there cannot arise a contradiction because the other end could not be continued at an earlier stage and this means that its new neighbor may have the value 1 or the value 0 without causing any contradiction.

As was mentioned above, if any contradiction was found then the value of n must be erased from the list of n-values. If there are contradictions for all values of n, that is, if at the end, the list of n-values is empty then the fixed point generator must state that there exists no solution and stop.

Through this process it is possible to discover if no feasible sequence of carries exists, and otherwise to produce, in principle, every feasible sequence of carries. If there is a feasible sequence of carries it can be used to construct every triplet of solving numbers x, y, z, as described below.

Number Construction from a Carry Sequence

Note that at this point, all contradictions in the carry sequence have been eliminated.

To construct the numbers x, y, and z, given a feasible carry sequence $C_m$, first assume that this entire carry sequence is known and that it is feasible. For each value of $m \in \{0, 1, \ldots, N-1\}$ there exist numerical values for $C_m$, $C_{m+1}$, MCN, CN and perhaps some of the values i, j, k.

Next, start with Equation (21) $i+j-k=2C_m-C_{m+1}$ and transfer to the right hand side of this equation all of the known values for i, j, k. This results in an equation of form $$\alpha = RHS \tag{29}$$

where the right hand side (RHS) has a known numerical value that equals a simple additive and/or subtractive combination ($\alpha$) of the unknown values of i, j, k.

It is easy to see that $$RHS = 2C_m - C_{m+1} - CN \tag{30}$$

and that $\alpha$ depends on MCN such that $$\alpha + CN = i + j - k \tag{31}$$

For instance, if MCN=3 then CN=i, $\alpha$=j−k and Equation (29) becomes j−k=RHS. If MCN=2 then CN=i−k, $\alpha$=j and Equation (29) becomes j=RHS, and so on. The form of Equation (29) and all of its solutions, in all of the possible cases, are summarized as follows:

TABLE 5

| Values for i, j, and k |
| --- |
| MCN = 0, $\alpha$ is an empty expression |
| RHS = 0: i, j, k are all known |
| MCN = 1, $\alpha$ = −k |
| RHS = −1 or 0: k = −RHS |
| MCN = 2, $\alpha$ = j |
| RHS = 0 or 1: j = RHS |
| MCN = 3, $\alpha$ = j − k |
| RHS = −1: (j, k) = (0, 1) |
| RHS = 0: (j, k) = (0, 0), (1, 1) |
| RHS = 1: (j, k) = (1, 0) |
| MCN = 4, $\alpha$ = i |
| RHS = 0 or 1: i = RHS |
| MCN = 5, $\alpha$ = i − k |
| RHS = −1: (i, k) = (0, 1) |
| RHS = 0: (i, k) = (0, 0), (1, 1) |
| RHS = 1: (i, k) = (1, 0) |
| MCN = 6, $\alpha$ = i + j |
| RHS = 0: (i, j) = (0, 0) |
| RHS = 1: (i, j) = (0, 1), (1, 0) |
| RHS = 2: (i, j) = (1, 1) |
| MCN = 7, $\alpha$ = i + j − k |
| RHS = −1: (i, j, k) = (0, 0, 1) |
| RHS = 0: (i, j, k) = (0, 0, 0), (0, 1, 1), (1, 0, 1) |
| RHS = 1: (i, j, k) = (0, 1, 0), (1, 0, 0), (1, 1, 1) |
| RHS = 2: (i, j, k) = (1, 1, 0) |

Thus, knowing the numerical values of MCN and RHS for every $m \in \{0, 1, \ldots, N-1\}$, it is possible to select from Table 5 a solution which completes the triplet i, j, k, for every m. Wherever the list includes several solutions for some combination of MCN, RHS, one of the solutions is chosen at random. Making such choices for all values $m \in \{0, 1, \ldots, N-1\}$ completes the construction of x, y, z.

Fixed-Point Generator Solution-Seeker

Based on the above discussion, the solution-seeking method illustrated in FIG. 4 can be used for the fixed point generator. First, list 401 is a list of possible n-values. Block 411 then operates as follows: In accordance with the procedures detailed above, try to construct the missing terms of $C_m$. If there are any contradictions, there is no solution for the selected n, and decision-point 413 branches to erase block 417. If there are no contradictions, then sequence $C_m$ is a feasible solution. Using the constructed sequence $C_m$ and masks $M_x$, $M_y$, $M_z$, set values for i, j, and k for each $m \in \{0, 1, \ldots, N-1\}$. Whenever there is more than one possibility for choosing i, j, k, make a random choice. The found solution is the completed construction with x, y, z, and $C_m$, and decision-point 413 branches to output block 415 to return the solution.

Operation of the Addition Significand Generator

Addition significand generator 235 (FIG. 2) always applies fixed point generator 245 with N=p. The reasoning is as follows: the exponent of a+b is almost always equal to the exponent of c. The only exception to this is in the post-normalization case which occurs when a+b rounds upward to produce $S_c=1.00\ldots 0$ exactly. In this case, the exponent of c is 1 greater than that of a+b. Temporarily ignoring this exceptional case (which is discussed below), align the significands $S_a$, $S_b$, and $S_c$ according to the values of $Q_a$ and $Q_b$. When this is done, some of the trailing bits of $S_a$, $S_b$ are positioned to the right of the least significant bit of $S_c$ and form "tails", as shown below, which contribute to the sum c only through carry and/or rounding into the least significant bit of the sum:

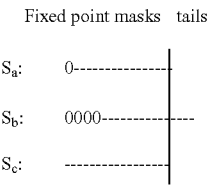

Figure 3:
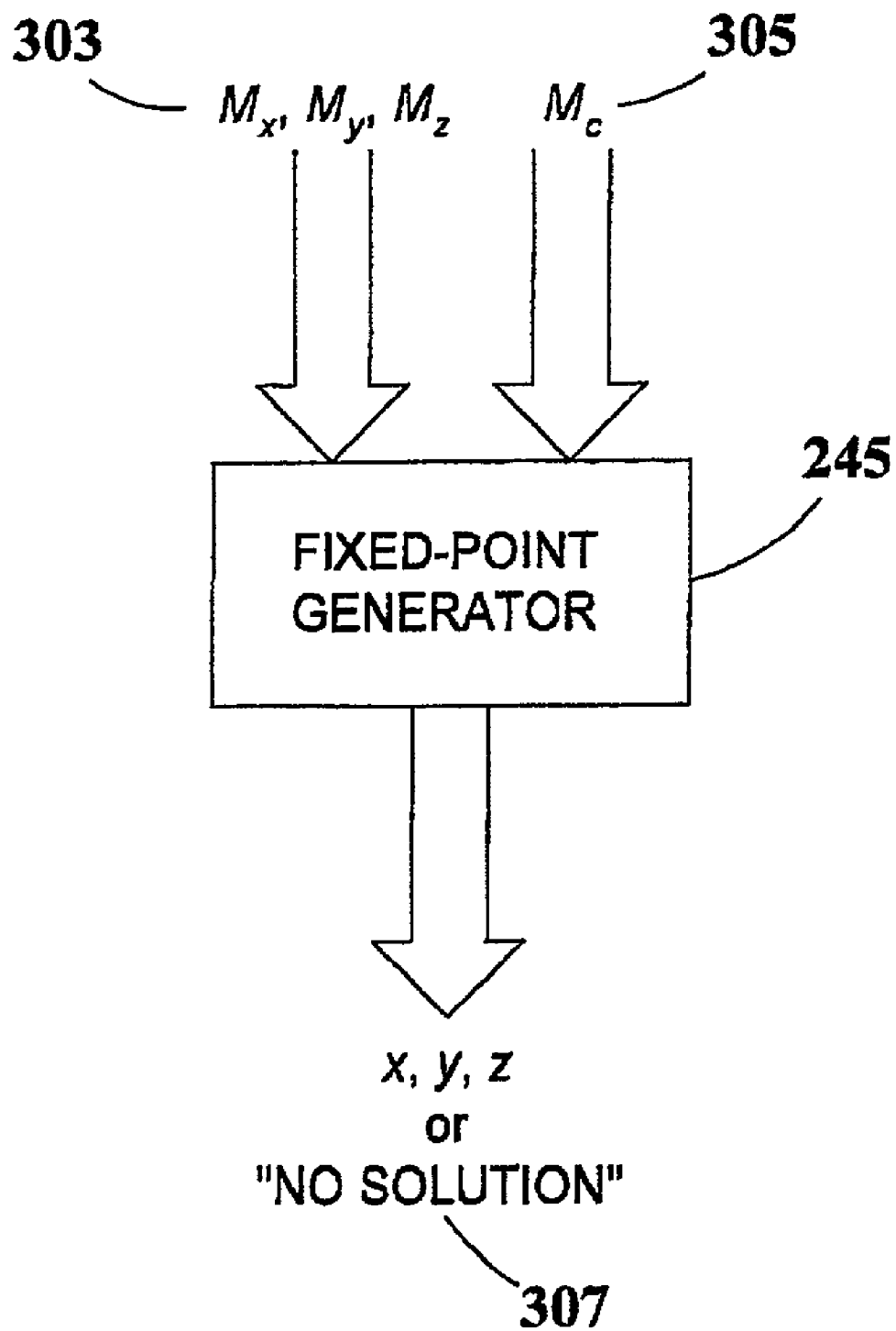
FIG. 3 is a simplified block diagram of a fixed-point generator according to the present invention.

With reference to FIG. 3, input 303 to fixed point generator 245 contains the shifted and truncated masks of $S_a$, $S_b$ as shown above. In addition, input 305 is a carries mask $M_C$="0xx . . . x$C_p$", where $C_p \in \{0, 1, 2\}$ has the contribution of the tails, which combines the effects of carry and of rounding.

First, a numerical value is chosen for $C_p$ of 0, 1, or 2. Next, the tails are generated, and finally $S_c$ and the left parts of $S_a$ and $S_b$ are generated. This is done by using the fixed point generator, as detailed below.

Denote the leftmost bits of the tails by $a_2$, $b_2$, respectively, and the remainders of the tails by $a_3$, $b_3$:

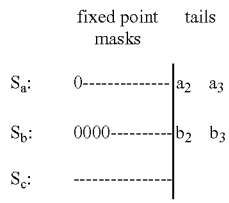

Clearly, the value of $C_p$ is determined by $a_2$, $b_2$, $a_3$, and $b_3$.

Either $Q_a \in \{0, 1\}$ or $Q_b \in \{0, 1\}$, and therefore either $a_3=0$ or $b_3=0$. So, denoting $c_3=a_3+b_3$ it is then clear that $c_3=a_3$ if $Q_b \in \{0, 1\}$ and $c_3=b_3$ if $Q_a \in \{0, 1\}$. $C_p$ thus depends on $a_2$, $b_2$, and $c_3$.

The Tails Triplet

Actually it is not necessary to know the whole sequence of the bits of $c_3$, but only the result of an OR operation over all of the bits of $c_3$, denoted herein as $OR(c_3)$. The triplet of bits $(a_2, b_2, OR(c_3))$ is herein denoted as the "tails triplet". Thus, for instance, if the tails triplet is (1, 1, 0) and the rounding mode is round up then $C_p=1$. If the tails triplet is (1, 0, 1) and the rounding mode is round to nearest/even then $C_p=1$, and so on.

All of the possible tails triplets, for each of the rounding modes and for each of the possible values of $C_p$, are as follows:

TABLE 6

Tails Triplets round down $C_p = 0$: (0, 0, 0), (0, 0, 1), (0, 1, 0), (0, 1, 1), (1, 0, 0), (1, 0, 1)
$C_p = 1$: (1, 1, 0), (1, 1, 1)

round up $C_p = 0$: (0, 0, 0)
$C_p = 1$: (0, 0, 1)$^0$, (0, 1, 0)$^0$, (0, 1, 1)$^1$, (1, 0, 0)$^0$, (1, 0, 1)$^1$, (1, 1, 0)
$C_p = 2$: (1, 1, 1)$^0$ round to nearest/even $C_p = 0$: (0, 0, 0), (0, 0, 1), (0, 1, 0)$_0$, (1, 0, 0)$_0$
$C_p = 1$: (0, 1, 0)$^0{}_0$, (0, 1, 1)$^2$, (1, 0, 0)$^0{}_0$, (1, 0, 1)$^2$, (1, 1, 0), (1, 1, 1)

Some of the triplets listed in Table 6 have a numerical subscript and/or superscript: The subscript $_0$ means that the corresponding triplet implies round to even case. Such a case is possible with the indicated $C_p$ value only if the last character of $S_c$ is forced to be '0'. The existence of a superscript indicates that the rounding component of the contribution of the tails is 1, which means that a result with $S_c=1.00\ldots 0$ is post-normalized and is potentially wrong, because the exponent may have changed size, thereby invalidating the original shifting assumption by 1 bit (as further discussed below).

The generation of $S_a$, $S_b$, $S_c$ starts by constructing a three-character mask for the tails triplet. The elements of this mask, which correspond to $a_2$ and $b_2$ are simply copied from $M_{Sa}$, $M_{Sb}$ or are set to be '0' if $a_2$ and/or $b_2$ fall outside of the range of the corresponding shifted mask. The element which corresponds to $c_3$ is set to be '1' if the corresponding part of $M_{Sa}$ or $M_{Sb}$ includes at least one '1' character. If not, the element will be '0' if no 'x' exists in the appropriate part of $M_{Sa}$ or $M_{Sb}$ and 'x' otherwise.

After the mask of the tails triplet is ready, one tails triplet compatible with this mask is chosen from the complete list in Table 6. Note that in the case of round to nearest/even each of the triplets (0, 1, 0), (1, 0, 0) appears twice: once with $C_p=0$ and once with $C_p=1$. These appearances are considered to be distinct. Namely, a choice such as (0, 1, 0) with $C_p=0$ is different from the choice (0, 1, 0) with $C_p=1$.

Now that a tails triplet has been chosen, the construction of the two tails is straightforward. The construction of $S_c$ and of the left hand parts of $S_a$, $S_b$ is performed by the fixed-point generator.

Exceptional Case

As previously mentioned, there is an exceptional case where the exponent of a+b is smaller by 1 than that of c.

If the tails triplet chosen from Table 6 does not have any superscript it means that even if the generated $S_c$ is $1.00 \ldots 0$, there is no post-normalization. In this case, the result is correct and acceptable.

If, however, the tails triplet has a superscript and the fixed-point generator produces $S_c=1.00\ldots 0$ then it means that some thing may be wrong with the result and it is not certain that the produced $S_a$, $S_b$, and $S_c$ satisfy $S_c$=round $(2^{-Q_a}S_a+2^{-Q_b}S_b)$, as it should. This is discussed here in further detail.

If the superscript is $^0$ then the result is definitely wrong and cannot be corrected. In such a case, the result should be discarded and the significands construction should be repeated.

If the superscript is $^1$, it means that the result is in fact correct, and should be accepted.

If the superscript is $^2$, it means that the $c_3$ part of the tails should be constructed with care: Note that there are only two tails triplets with a superscript $^2$, in the list: They are (0, 1, 1) and (1, 0, 1) in the round to nearest/even mode, with $C_p=1$. Since the resulting $S_c$ was 1.00 . . . 0 it means that the p+1 first bits of the exact sum were 011 . . . 1 and that $c_3$ should be concatenated to the right of this, in order to produce the complete exact sum. This means that in order for the result generated by the fixed point generator to be usable, the leftmost bit of $c_3$ should be 1. The rest of the bits of $c_3$ are not important. If the leftmost bit of $c_3$ cannot be chosen to be 1 because of mask constraints, it means that the solution should be discarded and significand construction should be repeated.

Note that no possible solution of the significands generator problem is excluded by the method of generation described above, not even those with $S_c=1.00$ . . . 0 and exact sum 011 . . . $1c_3$.

Solution-Seeking Procedure for the Addition Significand Generator

To use the solution-seeker illustrated in FIG. 4, it is first necessary to construct list 401, and this is done by using $Q_a$, $Q_b$ and $M_{Sa}$, $M_{Sb}$, to produce a three-character mask for the tails triplet, and then constructing a sublist of tails triplets compatible with this mask from the complete list in Table 6. List 401 contains these tails triplets. Block 411 operates by invoking the fixed-point generator to construct $S_c$ and the left hand parts of $S_a$, $S_b$. If the fixed-point generator states that there is no solution, then decision-point 413 branches to erase block 417. Otherwise, use the chosen tails triplet to construct the tails, and thereby complete the construction of $S_a$ and $S_b$, after which decision-point 413 branches to output block 415, which outputs $S_c$ and the zero-padded left hand parts of $S_a$, $S_b$ as the found solution.

Operation of the Subtraction Significand Generator

Denote c=a−b, and c=round(c). The rounding error is denoted by ϵ=|c−c|. If c is rounded down, c+ϵ=a−b, or b+(c+ϵ)=a. If c is rounded up, then c−ϵ=a−b, or b+c=(a+ϵ). In either case there is an exact identity which includes only one addition of nonnegative numbers. The numbers can be considered to be fixed-point numbers, and if there were masks for these three fixed-point numbers, it would be possible to use the fixed-point generator to generate them. This is in fact the case, as is shown as follows:

Note that the non-zero bits of ϵ always lie to the right of the least significant bit of c. Also, a≧c⇒a≧c, so the non-zero bits of ϵ lie to the right of the least significant bit of a as well. This means that the bits of c+ϵ are composed of the bits of c and the bits of ϵ written in sequence, one after the other. A similar point holds for a+ϵ. This can be illustrated graphically: Assume, for instance, that the rounding mode is round down, that $Q_b=3$ and that $Q_c=1$. Then the masks for a, b, and c+ϵ may be chosen to be

```
                  S_b
 b:      000---------------

S_c
 c + ε:  0---------------xx

S_a
 a       ---------------000
```

These masks are composed of the masks for $S_a$, $S_b$, $S_c$, padding '0' characters and padding 'x' characters. Note that, because ϵ can be anything, the mask for ϵ has 'x' characters; furthermore, because a is the largest of the three numbers a, b, and c, a determines the shift of the other two. Because the rounding mode for this example is round down, the rightmost three characters for the mask $M_a$ are all '0'. If the rounding mode were round up, the rightmost three characters for the mask $M_a$ would be 'x' instead.

The fixed-point generator is used to generate the three numbers and then extract from their binary representations the bits of $S_a$, $S_b$, $S_c$. In this particular case for the fixed-point generator, N=p+3, and the mask for the sequence of carries is "0xx . . . xx0". It turns out that the maximum needed value for N is of the order of 2p, because if $Q_b$ is larger than p it is necessary to know only if b>0, and the details of the bits of b are of no significance. A similar treatment may be used if the rounding mode is round up. In such a case, however, the bits of ϵ must be added to those of a instead of c.

Details for the Round Down Rounding Mode

The identity that must be used in the round down case is b+(c+ϵ)=a. In a similar manner to Table 1, the combinations of $Q_b$, $Q_c$ which should be considered are listed below in Table 7.

TABLE 7

| $Q_b$, $Q_c$ Pairs for Subtraction | | | | | | | | | | | |
|---|---|---|---|---|---|---|---|---|---|---|---|
| $Q_b$ | 0 | 0 | 1 | 1 | 0 | 0 | ... | 0 | 0 | 1 | 1 | ... | 1 |
| $Q_c$ | 0 | 1 | 0 | 1 | 2 | 3 | ... | p−1 | ≧p | 2 | 3 | ... | p |
| $Q_b$ | 1 | 2 | 3 | ... | p−1 | ≧p | 2 | 3 | ... | p | >p |
| $Q_c$ | >p | 0 | 0 | ... | 0 | 0 | 1 | 1 | ... | 1 | 1 |

The common length of the masks that must be presented to the fixed-point generator for most of the combinations is N=p+max($Q_b$,$Q_c$). The mask for $S_b$ should be padded to the left by $Q_b$ '0' characters (if $Q_b$>0) and to the right by $Q_c$−$Q_b$ '0' characters (if $Q_b$<$Q_c$). The mask for $S_c$ should be padded to the left by $Q_c$ '0' characters (if $Q_c$>0) and by $Q_b$−$Q_c$ 'x' characters to the right (if $Q_c$<$Q_b$). The mask for $S_a$ never has to be padded to the left (because a≧b, a≧c) and should be padded to the right by max($Q_b$,$Q_c$) '0' characters (unless $Q_b$=$Q_c$=0). The mask of the carries must always be of the form "0xx . . . xx0".

The cases ($Q_b$,$Q_c$)∈{(0,≧p), (1,>p), (≧p,0), (>p,1)} should be treated in a slightly different way:

In the two cases where $Q_c$≧p or $Q_c$>p, $S_c$=0, unless this is not compatible with its mask, in which case there is no solution. Generating a solution, then, is straightforward.

In the two cases where $Q_b$≧p or $Q_b$>p, $S_b$ may be any bit string which is compatible with its mask. The three-number masks that must be presented to the fixed-point generator are of length N=p+$Q_c$+1 each, where the mask for b is composed only of '0' characters except for the rightmost one, which is '1' if ≠0 and is '0' otherwise. The mask for $S_c$ is padded by $Q_c$ '0' characters to the left and by a single 'x' to the right. The mask for $S_a$ is padded by $Q_c$+1 '0' characters to the right. After a solution to the fixed-point problem is determined, the bit strings for $S_a$, $S_b$, and $S_c$ may be easily constructed.

Details for the Round Up Rounding Mode

The identity that must be used in the round up case is b+c=(a+ϵ). The combinations of $Q_b$, $Q_c$ which should be considered are also those listed in Table 7. Again, in most cases, the length of the masks, presented to the fixed-point generator is N=p+max($Q_b$,$Q_c$). The mask for $S_b$ is padded by $Q_b$ '0' characters to the left (if $Q_b$>0) and by $Q_c$−$Q_b$ '0' characters to the right (if $Q_b$<$Q_c$). The mask for $S_c$ should be padded by $Q_c$ '0' characters to the left (if $Q_c$>0) and by $Q_b$–$Q_c$ '0' characters to the right (if $Q_c$<$Q_b$). The mask for $S_a$ does not have to be padded on the left side. On the right side the mask for $S_a$ must be padded with $Q_c$ '0' characters (if $Q_c$>0) and by $Q_b$–$Q_c$ 'x' characters on the right (if $Q_c$<$Q_b$). The mask for the carries is, again, of the form "0xx . . . xx0".

In the four cases where either $Q_c \geq p$ or $Q_b \geq p$ the treatment is, again, slightly different:

In the two cases where $Q_c \geq p$, $S_c$ must be zero, unless this is not compatible with the mask, in which case there exists no solution.

In the two cases where $Q_b \geq p$, $\epsilon = \underline{b}$ and $\underline{c} = \underline{a}$ ($Q_c = 1$ is impossible, then). So $S_b$ may be chosen to be any number which is compatible with its mask and $S_c = S_a$ may be chosen to be any positive number which is compatible with the masks of both $S_a$ and of $S_c$.

In the discussion above, it has been implicitly assumed that the exponents of c and of $\underline{c}$ are the same. This is always so in the case of round down. However, if round( ) is round up there exists one exceptional case: If the significand of $\underline{c}$ is 1.00 . . . 0 and $\epsilon$>0 then this implicit assumption is not satisfied. Unless the leftmost bit of $\epsilon$ (the bit which corresponds to the leftmost 'x' character in the right padding of $S_a$) is 0, this leads to an error. So solutions returned by the fixed-point generator in which $S_c$=1.00 . . . 0 and the leftmost bit of $\epsilon$ is 1 should be rejected, and an additional attempt to produce a solution should be made.

Details for the Round to Nearest/Even Rounding Mode

For round to nearest/even the rounding is sometimes round up and sometimes round down. So the algorithm for this case is a mixture of the algorithms for round up and for round down. Consider again the combinations of $Q_b$, $Q_c$ listed in Table 7. In the same way that the masks for $S_a$, $S_b$, $S_c$ were extended and padded for round down and round up, those masks are also extended and padded in the round to nearest/even case. A new factor, however, is the splitting of the discussion of each combination of $Q_b$, $Q_c$ into four subcases:

1. Case of round to nearest/down, in which the identity $\underline{b}+(\underline{c}+\epsilon)=\underline{a}$ is used, and the extended masks of $S_a$, $S_b$, $S_c$ are padded in the same way as in the round down case, except that the "xx . . . x" padding that corresponds to $\epsilon$ is replaced by "0xx . . . x" padding.
2. Case of round to nearest/up: The identity $\underline{b}+\underline{c}=(\underline{a}+\epsilon)$ is used, and the extended masks of $S_a$, $S_b$, $S_c$ are padded in the same way as in the round up case, except that the "xx . . . x" padding, that corresponds to $\epsilon$ is replaced, again, by "0xx . . . x" padding. As in the round up case a solution with $S_c$=1.00 . . . 0 is rejected, unless the leftmost x (of $\epsilon$) is replaced in the solution by 0 (i.e. the bits of $\epsilon$ are compatible with "00xx . . . x") or the bits of $\epsilon$ in the solution are 0100 . . . 0 exactly.
3. Case of round to even/down: This is exactly like case 1 above, except that the "0xx . . . x" padding is replaced by "100 . . . 0" padding and the last character of the mask of $S_c$ is replaced by '0' (this can be done only if the original last character of $M_{S_c}$ is '0' or 'x').
4. Case of round to even/up: This is exactly like case 2 above, except that the "0xx . . . x" padding is replaced by "100 . . . 0" padding and the last character of the mask of $S_c$ is replaced by a '0' (again, this can be done only if the original last character of $M_{S_c}$ is '0' or 'x'). A solution with $S_c$=1.00 . . . 0 must be rejected. Thus, a solution with $S_c$=1.00 . . . 0 cannot be produced in this case. Note, however, that such a solution may be produced in case 2 (see the discussion at the end of case 2, where the bits of $\epsilon$ are 0100 . . . 0).

This discussion may be completed in a straightforward manner to also include the cases where $Q_b \geq p$ or $Q_c \geq p$.

Solution-Seeking Procedure for the Subtraction Significand Generator

Subtraction significand generator 240 (FIG. 2) does not utilize sets of "tails triplets" as are employed by addition significand generator 235, and therefore does not recursively use the solution-seeker method illustrated in FIG. 4. Instead, the solution-searching action of subtraction significand generator 240 is part of the floating-point subtraction test-generator's solution-seeking block 411 is as follows: Given numerical values for $Q_b$, $Q_c$ from calculator 225 based on the particular values of $q_b$, $q_c$ selected from the floating-point subtraction test-generator's list 401, use Table 7 to classify this pair in order to use the appropriate procedure, out of those described above, to generate three significands. If the construction was successful decision-point 413 branches to output block 415, which outputs the complete floating-point solution (biased exponent and significand). Otherwise, if the construction failed, decision-point 413 branches to erase block 417 which erases the selected $q_b$, $q_c$ selected from the floating-point subtraction test-generator's list 401.

The Biased Exponent Generators

Biased exponent generator 210 (FIG. 2) includes both definite biased exponent generator 215 and indefinite biased exponent generator 220. In both of these biased exponent generators $q_1 \in \{0, 1\}$ and $e_3 = e_1 + q_1$. There are then two possible cases: $e_3 = e_1$ and $e_3 = e_1 + 1$. In the case of definite biased exponent generator 215, there is a given definite value of $q_2$ such that $e_3 = e_2 + q_2 = e_1 + q_1$. That is, the exponent of the output result is a definite amount different from the exponent of either input operand. In the case of indefinite biased exponent generator 220, however, the value of $q_2$ is indefinite, and it is merely known that $q_2 > q$. That is, the exponent of the output result is not a definite amount different from the exponent of either input operand. The definite biased exponent generator and the indefinite biased exponent generator are non-limiting examples of a more general definite exponent generator and a more general indefinite exponent generator, respectively, that obtain solutions for exponent pairs in these two cases.

Definite Biased Exponent Generator

In the case $e_3 = e_1$, the common value of $e_1$ and $e_3$ must be compatible with both the masks $M_1$ and $M_3$. If the two masks have different number characters in the same position then they are incompatible and no pair $e_1$, $e_3$ exists. Otherwise, it is very easy to produce their intersection, $M_{13}$, based on the individual character intersections as shown in Table 8 below. Note that incompatible character intersections are not defined and are denoted by Ø.

TABLE 8

Mask Character Intersections

|   | '0' | '1' | 'x' |
|---|-----|-----|-----|
| '0' | '0' | Ø | '0' |
| '1' | Ø | '1' | '1' |
| 'x' | '0' | '1' | 'x' |

The problem is now one of producing $e_2$ and $e_3$ that satisfy $e_3 = e_2 + q_2$. There are masks for $e_2$, $e_3$ (i.e. $M_2$, $M_{13}$) and it is possible to construct a mask composed of numerical characters only for $q_2$. This is equivalent to a problem of fixed-point addition, and therefore, the problem may be solved by using the fixed-point generator.

In the case $e_3=e_1+1$, note that the right hand end of the string of bits of biased exponent $e_1$, must be one of the following: 0, 01, 011, 0111, ..., 011 ... 1 (the last string is of length w). Because $e_3=e_1+1$, the right hand end of $e_3$ must be, respectively: 1, 10, 100, 1000, ..., 100 ... 0 (here also the last string is of length w). Comparing the possible right ends of $e_1$, $e_3$ with the masks $M_1$, $M_3$ it is usually possible to erase some of the possibilities and what is left is a reduced list of pairs of right-hand ends of $e_1$, $e_3$ (which constitute solution-seeker list 401 in FIG. 4). In any of these pairs, the left ends of $e_1$, $e_3$ must be identical. This means that the masks of $e_1$ and $e_3$ may be chosen to be composed of known numerical characters in the right ends, and of the intersection of the left hand ends of $M_1$ and $M_3$ (if the left ends of $M_1$ and $M_3$ are incompatible then the corresponding pair of right ends, will be erased from list 401).

Thus, every choice of a pair of right ends of $e_1$, $e_3$ results in a condition similar to the one for the case $e_1=e_3$: There are masks $M_2$, $M_{13}$ for $e_2$, $e_3$ and a mask for $q_2$, and $e_2$, $e_3$ must be found from the relation $e_3=e_2+q_2$. This, again, can be solved by the fixed-point generator. If the generator states that there is no solution it means that the selected pair of right ends will be erased from list 401, and another pair should be selected and tried. If list 401 is empty it means that there is no solution which satisfies $e_3=e_2+1$.

When employing the solution-seeker illustrated in FIG. 4, given $M_1$, $M_3$, and $q_2$ as a selection, the procedure for block 411 is as follows:

1. If $M_1$ and $M_3$ are incompatible, output that there is no solution. Block 411 is complete, after which decision-point 413 branches to block 417. Otherwise, if $M_1$ and $M_3$ are compatible, construct $M_{13}$ and continue.
2. If $M_{13}$ exists, present $M_2$, $M_{13}$, and $q_2$ to the fixed point generator to generate $e_2$ and $e_3$ satisfying $e_3=e_2+q_2$.
3. If the fixed point generator states that there is no solution, output that there is no solution. Block 411 is complete, after which decision-point 413 branches to block 417. Otherwise, if there exist $e_2$ and $e_3$ satisfying $e_3=e_2+q_2$, construct $e_1$ from $e_3$.
4. Return $e_1$, $e_2$, and $e_3$. Block 411 is complete, after which decision-point 413 branches to block 415 to output the solution $e_1$, $e_2$, and $e_3$.

Indefinite Biased Exponent Generator

The analysis of the indefinite biased exponent generator is similar to the above analysis of the definite biased exponent generator, up to the point where there exists a new mask, $M_{13}$, for $e_3$ (this applies to the case $e_3=e_1$ as well as to the case $e_3=e_1+1$). Thus, the remaining problem is to generate $q_2$, $e_2$, and $e_3$ where there are masks $M_2$ and $M_{13}$ for $e_2$ and $e_3$, respectively, which satisfy the relation $(e_3-e_2)=q_2>q$.

The smallest $e_2$ that is compatible with $M_2$ is obtained by replacing each 'x' in $M_2$ by '0', and this is denoted by $e_{2\ SMALLEST}$. The largest $e_3$ which is compatible with $M_{13}$ is obtained by replacing each 'x' in $M_{13}$ by a '1', and this is denoted by $e_{3\ LARGEST}$. There exists a solution for the indefinite biased exponent generator if and only if $e_{3\ LARGEST}-e_{2\ SMALLEST}>q$. If this inequality is not satisfied, the indefinite biased exponent generator reports that no solution exists, and is finished.

If a solution exists, it is necessary to choose a random pair $e_2'$, $e_3'$ for which $e_3'-e_2'>q$, and for which $e_2'$ and $e_3'$ are compatible with $M_2$ and $M_{13}$, respectively. This is done as described below:

To start, erase from $M_2$ all of the '0' and '1' characters, to leave a submask composed of 'x' characters only. The numbers $e_2^o$ which are compatible with this submask, are in a natural isomorphic (one-to-one) correspondence with the numbers $e_2$ that are compatible with $M_2$. Clearly, $e_2$ is a monotonically-increasing function of $e_2^o$ and vice versa. Similar relations exist between $e_3$ and $e_3^o$ via the mask $M_{13}$.

Figure 5:
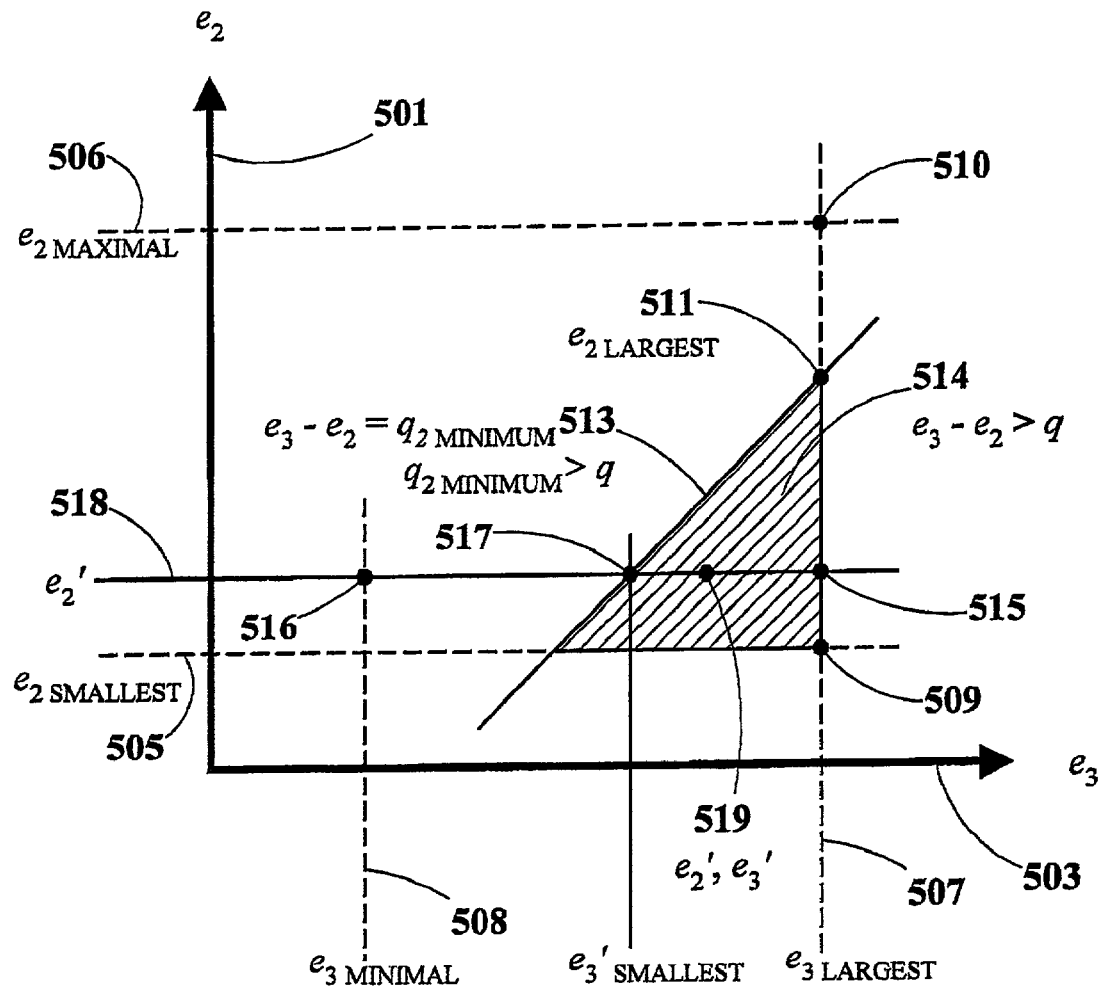
FIG. 5 graphically shows the finding of a solution for the indefinite biased exponent generator.

The construction of random $e_2'$ and $e_3'$ which are compatible with the masks $M_2$ and $M_{13}$, respectively, and satisfy $e_3'-e_2'>q$, is illustrated graphically in FIG. 5 and is computed analytically as follows (in this description, $e_2^o$, $e_2^o{}_{SMALLEST}$, $e_2^o{}_{LARGEST}$, $e_2^{o\prime}$ correspond to $e_2$, $e_{2\ SMALLEST}$, $e_{2\ LARGEST}$, $e_2'$, respectively, by the isomorphic correspondence via $M_2$; and $e_3^o$, $e_3^o{}_{LARGEST}$, $e_3^{o\prime}$, $e_3^{o\prime}{}_{SMALLEST}$ correspond to $e_3$, $e_{3\ LARGEST}$, $e_3'$, $e_{3\ SMALLEST}'$, respectively, via $M_{13}$). FIG. 5 shows an $e_2$ axis 501 and an $e_3$ axis 503.

1. Compute $e_{2\ SMALLEST}$, $e_{3\ LARGEST}$ with $e_2^o{}_{SMALLEST}=00\ldots0$, and $e_3^o{}_{LARGEST}=11\ldots1$, respectively. A horizontal $e_{2\ SMALLEST}$ line 505 and a vertical $e_{3\ LARGEST}$ line 507 thus delineate two boundary lines of the solution space, which intersect at a point 509. For convenience, also compute $e_{2\ MAXIMAL}$, $e_{3\ MINIMAL}$ with $e_2^o{}_{MAXIMAL}=11\ldots1$, and $e_3^o{}_{MINIMAL}=00\ldots0$, respectively. A horizontal $e_{2\ MAXIMAL}$ line 506 and a vertical $e_{3\ MINIMAL}$ line 508, and a point 510 at the intersection of line 506 and line 507 are useful in performing searches, as will be discussed below.

2. Compute $e_2^o{}_{LARGEST}=\max\{e_2^o|e_{3\ LARGEST}-e_2^o>q\}$. This may be done by any convenient search-and-test method, but it is well-known in the art that a convenient and rapidly-converging search method for monotonic functions is the binary, or "bisection" search, where an interval having $2\delta$ elements is divided into two contiguous intervals of $\delta$ elements each, whose boundary point can be quickly evaluated to determine in which of the two intervals the next iteration of the search should be performed (where an interval has an odd number of elements, $2\delta+1$, the "bisection" breaks the interval into intervals of $\delta$ and $\delta+1$ elements, respectively). Graphically, this is represented on the line segment defined by point 509 and point 510, which may be successively bisected until $e_{2\ LARGEST}$ is found. Also graphically, an $e_{2\ LARGEST}$ point 511 establishes an upper limit on the extent of the solution space. A line 513 represents $e_3-e_2=q_2$ where $q_2$ is the minimum value such that $q_2>q$. Line 505, line 507, and line 513 and the area enclosed thereby, thus define a solution space 514, where $e_3-e_2>q$. Note that it is not necessary to determine line 513 or the analytical counterpart thereof, nor is it necessary to determine all the solutions in solution space 514. It is only necessary to determine a single point at random within space 514, such that every point within space 514 has approximately the same non-zero probability of being selected.

3. Choose an integer $e_2^{o\prime}\in[e_2^o{}_{SMALLEST}, e_2^o{}_{LARGEST}]$, at random, and from this derive $e_2'$. Graphically, $e_2'$ is represented by a horizontal line 518 through a point 515, which is chosen randomly in the line segment defined by point 509 and point 511, inclusive of point 509 and point 511.

4. Compute $e_3^{o\prime}{}_{SMALLEST}=\min\{e_3^o|e_3-e_2'>q\}$, and from this derive $e_3'{}_{SMALLEST}$. This can be done, for example, using a binary search, which is graphically represented on the line segment defined by point 515 and a point 516, which is defined by the intersection of line 508 and line 518. A point 517 represents $e_3'{}_{SMALLEST}$, and it can be seen that point 517 necessarily lies on line 513.

5. Choose an integer $e_3^{o\prime} \in [e_3^{o\prime}{}_{SMALLEST}, e_3^{o}{}_{LARGEST}]$ at random, and from this derive $e_3'$. Graphically, a point 519 chosen randomly on the line segment between point 515 and point 517 will have coordinates $e_2'$, $e_3'$, which is guaranteed to be in solution space 514.

Alternatively, it is possible to solve for $e_2^{o\prime}$ and $e_3^{o\prime}$, and afterward derive $e_2'$ and $e_3'$. Set the returned solution $e_2 = e_2'$ and $e_3 = e_3'$. The right end of $e_1$ is known and the left end may be copied from $e_3$. Also, $q_2 = e_3' - e_2'$.

When employing the solution-seeker illustrated in FIG. 4, given $M_1$ and $M_3$ as a selection, the procedure for block 411 is as follows:

1. If $M_1$ and $M_3$ are incompatible, output that there is no solution. Block 411 is complete, after which decision-point 413 branches to block 417. Otherwise, if $M_1$ and $M_3$ are compatible, construct $M_{13}$ and continue.
2. Using the above procedure, produce random $e_2'$ and $e_3'$ which are compatible with $M_2$ and $M_{13}$, respectively, and which satisfy $e_3' - e_2' > q$. If such $e_2'$ and $e_3'$ do not exist, output that there is no solution. Block 411 is complete, after which decision-point 413 branches to block 417. Otherwise, if $e_2'$ and $e_3'$ exist, continue.
3. Set $e_2 = e_2'$, $e_3 = e_3'$, and $q_2 = e_3' - e_2'$ and construct $e_1$ from $e_3$.
4. Return $e_1$, $e_2$, $e_3$, and $q_2$. Block 411 is complete, after which decision-point 413 branches to block 415 to output the solution $e_1$, $e_2$, $e_3$, and $q_2$.

While the invention has been described with respect to a limited number of embodiments, it will be appreciated that many variations, modifications and other applications of the invention may be made.

What is claimed is:

1. A system for generating floating-point test-cases for verifying the operation of a floating-point arithmetic unit, the system comprising a processing unit which includes:
   (a) an exponent generator, for generating floating-point exponents;
   (b) a significand generator, for generating floating-point significands; and
   (c) a fixed-point generator coupled to said exponent generator and to said signficand generator;
   wherein said processing unit is configured to receive a specified arithmetic operation, a specified rounding mode, at least one input operand mask, and an output result mask; and wherein said processing unit is configured to output a set of floating-point numbers which includes at least one input operand compatible with said at least one input operand mask, and an output result compatible with said output result mask; and wherein said output result corresponds to said specified arithmetic operation on said at least one input operand for said specified rounding mode.

2. A data storage storing a program of instructions executable by a machine for emulating a system for generating floating-point test-cases for verifying the operation of a floating-point arithmetic unit, the system comprising a processing unit which includes:
   (a) an exponent generator, for generating floating-point exponents;
   (b) a significand generator, for generating floating-point significands; and
   (c) a fixed-point generator coupled to said exponent generator and to said signficand generator;
   wherein said processing unit is configured to receive a specified arithmetic operation, a specified rounding mode, at least one input operand mask, and an output result mask; and wherein said processing unit is configured to output a set of floating-point numbers which includes at least one input operand compatible with said at least one input operand mask, and an output result compatible with said output result mask; and wherein said output result corresponds to said specified arithmetic operation on said at least one input operand for said specified rounding mode.

3. A data storage storing a program of instructions executable by a machine for emulating a system for generating floating-point test-cases for verifying the operation of a floating-point arithmetic unit, the system comprising a processing unit which includes:
   (a) an exponent generator, for generating floating-point exponents;
   (b) a significand generator, for generating floating-point significands; and
   (c) a fixed-point generator coupled to said exponent generator and to said signficand generator;
   wherein said processing unit is configured to receive a specified arithmetic operation selected from a group that includes addition and subtraction, a specified rounding mode, a first input operand mask, a second input operand mask, and an output result mask; and wherein said processing unit is configured to output a set of floating-point numbers which includes a first input operand compatible with said first input operand mask, a second input operand compatible with said second input operand mask, and an output result compatible with said output result mask; and wherein said output result corresponds to said specified arithmetic operation on said first input operand and said second input operand for said specified rounding mode.

4. A system for generating floating-point test-cases for verifying the operation of a floating-point arithmetic unit, the system comprising a processing unit which includes:
   (a) an exponent generator, for generating floating-point exponents;
   (b) a significand generator, for generating floating-point significands; and
   (c) a fixed-point generator coupled to said exponent generator and to said signficand generator;
   wherein said processing unit is configured to receive a specified arithmetic operation selected from a group that includes addition and subtraction, a specified rounding mode, a first input operand mask, a second input operand mask, and an output result mask; and wherein said processing unit is configured to output a set of floating-point numbers which includes a first input operand compatible with said first input operand mask, a second input operand compatible with said second input operand mask, and an output result compatible with said output result mask; and wherein said output result corresponds to said specified arithmetic operation on said first input operand and said second input operand for said specified rounding mode.

5. The system of claim 4, wherein said fixed-point generator has two addends and a carry sequence representing the carries from the addition of successive digits of said addends, wherein said carry sequence is compatible with a carry sequence mask.

6. The system of claim 4, said significand generator further comprising:
   (a) an addition significand generator, for generating floating-point significands for said addition operation; and
   (b) a subtraction significand generator, for generating floating-point significands for said subtraction operation.

7. The system of claim 4, wherein said first input operand has a first input operand exponent, said second input operand has a second input operand exponent, and said output result has an output result exponent, said exponent generator further comprising:
  (a) a definite exponent generator, for generating floating-point exponents wherein said output result exponent is a definite amount different from either of said first input operand exponent and said second input operand exponent; and
  (b) an indefinite exponent generator, for generating floating-point exponents wherein said output result exponent is not a definite amount different from either of said first input operand exponent and said second input operand exponent.

8. The system of claim 4, wherein said exponent generator is a biased exponent generator, for generating biased floating-point exponents.

9. The system of claim 8, wherein said first input operand has a first input operand biased exponent, said second input operand has a second input operand biased exponent, and said output result has an output result biased exponent, said biased exponent generator further comprising:
  (a) a definite biased exponent generator, for generating biased floating-point exponents wherein said output result biased exponent is a definite amount different from either of said first input operand biased exponent and said second input operand biased exponent and
  (b) an indefinite biased exponent generator, for generating biased floating-point exponents wherein said output result biased exponent is not a definite amount different from either of said first input operand biased exponent and said second input operand biased exponent.

10. The system of claim 8, further comprising an unbiased exponent shift calculator for computing an unbiased exponent shift from a biased exponent shift.

11. A method of seeking a solution, if a solution exists, to a specified mathematical condition, wherein the solution is used in constructing a floating-point test-case for verifying the operation of a floating-point arithmetic unit, wherein a complete generated test case is a set of floating-point numbers for a specified arithmetic operation and a specified rounding mode, and wherein a generated test case includes at least one input operand and an output result; and wherein an input operand is compatible with an operand mask, and the output result is compatible with an output result mask; the method comprising the steps of:
  (a) preparing a list of choices upon which the solution is based;
  (b) testing whether said list of choices is empty;
  (c) outputting, if said list of choices is empty, that no solution exists;
  (d) randomly choosing, if said list of choices is not empty, a choice of said list as a selection;
  (e) searching for a solution to the specified mathematical condition, based on said selection;
  (f) outputting, if said searching was successful, said solution;
  (g) erasing, if said searching was not successful, said selection from said list; and
  (h) repeating step (a) through step (g) until outputting occurs.

12. A data storage storing a program of instructions executable by a machine for performing a method of seeking a solution, if a solution exists, to a specified mathematical condition, wherein the solution is used in constructing a floating-point test-case for verifying the operation of a floating-point arithmetic unit, wherein a complete generated test case is a set of floating-point numbers for a specified arithmetic operation and a specified rounding mode, and wherein a generated test case includes at least one input operand and an output result; and wherein an input operand is compatible with an operand mask, and the output result is compatible with an output result mask; the method comprising the steps of:
  (a) preparing a list of choices upon which the solution is based;
  (b) testing whether said list of choices is empty;
  (c) outputting, if said list of choices is empty, that no solution exists;
  (d) randomly choosing, if said list of choices is not empty, a choice of said list as a selection;
  (e) searching for a solution to the specified mathematical condition, based on said selection;
  (f) outputting, if said searching was successful, said solution;
  (g) erasing, if said searching was not successful, said selection from said list; and
  (h) repeating step (a) through step (g) until outputting occurs.

13. A data storage storing a program of instructions executable by a machine for performing the method of seeking a solution, if a solution exists, to a specified mathematical condition, wherein the solution is used in constructing a floating-point test-case for verifying the operation of a floating-point arithmetic unit, wherein a complete generated test case is a set of floating-point numbers for a specified arithmetic operation selected from a group including addition and subtraction, and for a specified rounding mode, and wherein a generated test case includes a first input operand, a second input operand, and an output result; and wherein the first input operand is compatible with a first input operand mask, the second input operand is compatible with a second input operand mask, and the output result is compatible with an output result mask; the method comprising the steps of:
  (a) preparing a list of choices upon which the solution is based;
  (b) testing whether said list of choices is empty;
  (c) outputting, if said list of choices is empty, that no solution exists;
  (d) randomly choosing, if said list of choices is not empty, a choice of said list as a selection;
  (e) searching for a solution to the specified mathematical condition, based on said selection;
  (f) outputting, if said searching was successful, said solution;
  (g) erasing, if said searching was not successful, said selection from said list; and
  (h) repeating step (a) through step (g) until outputting occurs.

14. A method of seeking a solution, if a solution exists, to a specified mathematical condition, wherein the solution is used in constructing a floating-point test-case for verifying the operation of a floating-point arithmetic unit, wherein a complete generated test case is a set of floating-point numbers for a specified arithmetic operation selected from a group including addition and subtraction, and for a specified rounding mode, and wherein a generated test case includes a first input operand, a second input operand, and an output result; and wherein the first input operand is compatible with a first input operand mask, the second input operand is compatible with a second input operand mask, and the output result is compatible with an output result mask; the method comprising the steps of:
- (a) preparing a list of choices upon which the solution is based;
- (b) testing whether said list of choices is empty;
- (c) outputting, if said list of choices is empty, that no solution exists;
- (d) randomly choosing, if said list Df choices is not empty, a choice of sail list as a selection;
- (e) searching for a solution to the specified mathematical condition, based on said selection;
- (f) outputting, if said searching was successful, said solution;
- (g) erasing, if said searching was not successful, said selection from said list; and
- (h) repeating step (a) through step (g) until outputting occurs.

15. The method of claim 14, wherein said list of choices contains an exponent shift.

16. The method of claim 14, wherein the solution is a set of floating-point numbers.

17. The method of claim 14, wherein the solution is an exponent.

18. The method of claim 14, wherein the solution is a significand.

19. The method of claim 18, wherein said list of choices contains a tails triplet.

20. A method of generating a set of fixed-point numbers containing a first addend, a second addend, and a sum, wherein the first addend is compatible with a first addend mask, the second addend is compatible with a second addend mask, the sum is compatible with a sum mask, and wherein the addition of the first addend and the second addend results in a carry sequence of carry bits, wherein each carry bit has a unique index in the carry sequence, wherein the carry sequence is compatible with a carry sequence mask and wherein each carry bit has a value in the group consisting of 0, 1, and 2, and wherein there exists a boundary index in the carry sequence corresponding to the lowest index of a carry bit having the value 2; the method comprising the steps of:
- (a) constructing a list of possible boundary indices;
- (b) testing whether said list is empty;
- (c) outputting, if said list is empty, that no solution exists;
- (d) randomly choosing, if said list is not empty, a boundary index from said list as a selection;
- (e) searching for a carry sequence based on said selection, which is compatible with the carry sequence mask;
- (f) erasing, if said searching was not successful, said selection from said list;
- (g) constructing, if said searching was successful, a first addend compatible with tie first addend mask, a second addend compatible with the second addend mask, and a sum compatible with the sum mask;
- (h) outputting said first addend, said second addend, said sum, and said carry sequence; and
- (i) repeating step (a) through step (h) until outputting occurs.

21. A data storage storing a program of instructions executable by a machine for performing the method of generating a set of fixed-point numbers containing a first addend, a second addend, and a sum, wherein the first addend is compatible with a first addend mask, the second addend is compatible with a second addend mask, the sum is compatible with a sum mask, and wherein the addition of the first addend and the second addend results in a carry sequence of carry bits, wherein each carry bit has a unique index in the carry sequence, wherein the carry sequence is compatible with a carry sequence mask and wherein each carry bit has a value in the group consisting of 0, 1, and 2, and wherein there exists a boundary index in the carry sequence corresponding to the lowest index of a carry bit having the value 2; the method comprising the steps of:
- (a) constructing a list of possible boundary indices;
- (b) testing whether said list is empty;
- (c) outputting, if said list is empty, that no solution exists;
- (d) randomly choosing, if said list is not empty, a boundary index from said list as a selection;
- (e) searching for a carry sequence based on said selection, which is compatible with the carry sequence mask;
- (f) erasing, if said searching was not successful, said selection from said list;
- (g) constructing, if said searching was successful, a first addend compatible with the first addend mask, a second addend compatible with the second addend mask, and a sum compatible with the sum mask;
- (h) outputting said first addend, said second addend, said sum, and said carry sequence; and
- (i) repeating step (a) through step (h) until outputting occurs.

* * * * *